US012551929B2

(12) United States Patent
Rem et al.

(10) Patent No.: US 12,551,929 B2
(45) Date of Patent: Feb. 17, 2026

(54) RECYCLING OF SCRAP

(71) Applicant: Technische Universiteit Delft, Delft (NL)

(72) Inventors: Peter Carlo Rem, Delft (NL); Yongli Wu, Delft (NL); Francesco Di Maio, Delft (NL)

(73) Assignee: REUKEMA PARTICIPATIONS B.V., Harderwijk (NL)

( * ) Notice: Subject to any disclaimer, the term of this patent is extended or adjusted under 35 U.S.C. 154(b) by 0 days.

(21) Appl. No.: 18/197,605

(22) Filed: May 15, 2023

(65) Prior Publication Data
US 2023/0364647 A1  Nov. 16, 2023

(30) Foreign Application Priority Data

May 16, 2022 (NL) .................................... 2031877
May 16, 2022 (NL) .................................... 2031878
May 16, 2022 (NL) .................................... 2031879

(51) Int. Cl.
*B07B 13/00* (2006.01)
*B07B 13/05* (2006.01)
(Continued)

(52) U.S. Cl.
CPC ............ *B07B 13/003* (2013.01); *B07B 13/05* (2013.01); *B07B 13/065* (2013.01); *B02C 18/0092* (2013.01)

(58) Field of Classification Search
CPC ..... B07B 13/003; B07B 13/05; B07B 13/065; B02C 18/0092
(Continued)

(56) References Cited

U.S. PATENT DOCUMENTS 3,335,968 A * 8/1967 Young .................... B02C 21/02
241/101.76
10,207,296 B2 * 2/2019 Garcia ...................... B07C 5/34
(Continued)

FOREIGN PATENT DOCUMENTS

DE    102006059655 A1    6/2008
JP        H0237118 U     3/1990
(Continued)

OTHER PUBLICATIONS

Dutch Search Report and Written Opinion—App No. 2031877—mailing date Jan. 9, 2023.
(Continued)

*Primary Examiner* — Michael Mccullough
*Assistant Examiner* — Jessica L Burkman
(74) *Attorney, Agent, or Firm* — Fitch, Even. Tabin & Flannery LLP

(57) ABSTRACT

A method of recycling scrap is disclosed, comprising the steps of shredding the scrap with a shredder into shredded scrap objects, classifying the shredded scrap objects into fractions of scrap objects having different size ranges with a classifier, and sorting scrap objects while substantially maintaining interspace between the objects. Further, a singulating arrangement for singulating scrap objects is disclosed, comprising a substantially horizontally disposed feeder that extends from a receiving area for receiving scrap objects to a feed gate positioned at a top portion of a chute, as well as an ejector arrangement, comprising a conveyor with a substantially flat conveying plane and an ejector device disposed along the conveyor.

14 Claims, 13 Drawing Sheets

(51) Int. Cl.
  *B07B 13/065* (2006.01)
  *B02C 18/00* (2006.01)
(58) Field of Classification Search
  USPC .......................................................... 209/659
  See application file for complete search history.

(56) References Cited

U.S. PATENT DOCUMENTS

| | | | |
|---|---|---|---|
| 11,130,141 B2* | 9/2021 | Valerio | ..................... B03B 5/10 |
| 11,192,146 B2* | 12/2021 | Hawkins | ................. B07C 5/344 |
| 2019/0111455 A1 | 4/2019 | Killmann et al. | |
| 2023/0176028 A1* | 6/2023 | Kumar | ............... G01N 33/2028 |
| | | | 702/28 |

FOREIGN PATENT DOCUMENTS

| | | | |
|---|---|---|---|
| WO | 2019239052 A2 | 12/2019 | |
| WO | 2020242298 A1 | 12/2020 | |

OTHER PUBLICATIONS

Dutch Search Report and Written Opinion—App No. 2031878—mailing date Dec. 30, 2022.
Dutch Search Report and Written Opinion—App No. 2031879—mailing date Dec. 30, 2022.

* cited by examiner

RECYCLING OF SCRAP

CROSS-REFERENCE TO RELATED APPLICATIONS

This application claims priority under 35 U.S.C. § 119 to the following: Application NL 2031877, filed May 16, 2022; Application NL 2031878, filed May 16, 2022; and Application NL 2031879, Filed May 16, 2022, each of which is hereby incorporated by reference in its entirety.

The invention relates to recycling of scrap, in particular recycling of metal scraps.

Scrap material is typically collected locally as part of disposal. Scrap material may have a wide range of origins, and may comprise a mix of different materials, e.g. metal and other materials such as wood or plastics. To make scrap material suitable for recycling, the scrap material is typically sorted in several steps, e.g., in one or more steps into groups of one or more types of material. Scrap material may e.g., be sorted into plastics, metals, wood and composites. Materials may e.g., be sorted into subgroups, e.g., ferrous and non-ferrous metals, precious metals and (groups of) specific metals. Plastics may e.g., be sorted into thermoplastic and thermoharding plastics, and/or into fibre reinforced plastic and non fibre reinforced plastics. Scrap may also be sorted according to shape, e.g. plate, wire or profile.

In general, many classifications and grades of scrap material exist to make the scrap material more suitable for recycling and thus more valuable. Although sorting of scrap materials may be often carried out by efficient mechanized and or automated sorting processes, e.g. based on physical separation methods, there are still many sorting processes that require manual steps in the sorting process. Such steps typically relate to the selection of the scrap objects.

For example, aluminum scrap metal may include a mix of cast, sheet, profiled, or wire material, e.g. venetian blinds, castings, hair wire, screen wire, food or beverage containers, radiator shells, airplane sheet, bottle caps. Some of the aluminum material is wrought aluminum that e.g. includes alloys that include manganese and are suitable for reuse as aluminum for rolling, extrusion, drawing or forging processes. Another aluminum material is cast aluminum that e.g. has a relatively high percentage of alloying elements and is suitable for casting. For purposes of recycling, it may e.g. be useful to make a class of aluminum scrap by selecting from a mix of aluminum scrap objects as mentioned above only sheet metal objects of a number of aluminum alloys. This class of aluminum scrap is known as taint tabor.

To obtain this material class, typically a mix of aluminum wire, profiles and sheeting is collected at a scrap yard. Often, the aluminum mix is shredded into small pieces to reduce its volume, buffered and transported over long distances from the scrap yard to a location where manual labor is available to make the selection economically feasible. From the mix, the sheeting is then selected by manual sorting. The scrap material is assessed by eye, and sheeting parts are selected and extracted by hand. The manual steps in the sorting process are less desirable, as they involve manual labor that is relatively unhealthy, physically demanding and repetitive. Also the long-distance transport is less desirable. It e.g. requires time, effort and consumes an amount of energy that significantly impacts the environment. Further, long distance transport may be less desirable as it may involve export as less valuable scrap material and subsequent import as a more valuable raw material. Also, import and export restrictions may apply for scrap, as well as for raw material. For other types of materials, similar processes are used that involve shredding to small-sized objects, shipping in compact bulk, and manual selection.

The invention aims to alleviate the disadvantages, in particular by reducing the need for manual steps and/or long-distance transport. Specifically, the invention aims to provide steps in the selection of scrap materials with which manual steps and/or long-distance transport can be reduced cost-effectively. In particular, the invention aims to support economically feasible local recycling of scrap material, e.g. without import and/or export restrictions becoming applicable to the material.

Thereto, a first aspect of the invention provides for A method of recycling scrap, comprising the steps of
 shredding the scrap with a shredder into shredded scrap objects, the scrap being shredded to include objects having maximum pass through dimensions in the range of 50-200 mm, preferably 100-180 mm
 classifying the shredded scrap objects into fractions of scrap objects having different size ranges with a classifier, at least one size range including objects having maximum pass through dimensions in the range of 50-200 mm, preferably 100-180 mm, and
 sorting scrap objects from at least one size range that includes objects having maximum pass through dimensions in the range of 50-200 mm, preferably 100-180 mm, while substantially maintaining interspace between the objects.

By shredding scrap to include relatively large objects and maintaining interspace between the objects during sorting, the tendency of entanglement associated with larger-sized objects can be mitigated so that the advantage of more efficient processing associated with objects larger sized objects can be made use of. The shredding step may be carried out by a conventional shredder, i.e. any shredding device of the type known in the art suitable for shredding scrap, in particular metal scrap.

Within this context, a maximum pass through dimension is meant to comprise a maximum dimension of a scrap object that allows passing a dimension based classifying step, for example a sieving or measuring step. The maximum pass through dimensions may e.g. be a maximum diameter of the object, allowing objects of a maximum diameter irrespective of a maximum length transverse to the diameter to pass. The length may thus be smaller than, equal to or greater than the diameter. For a sieving step, the maximum pass through dimensions e.g. correspond to screen sizes of the sieve of 50-200 mm, preferably 100-180 mm. To facilitate handling during the sorting, preferably the objects of the at least one size range that includes objects having maximum pass through dimensions in the range of 50-200 mm, preferably 100-180 mm have maximum dimensions in absolute sense, e.g. a length transverse to a maximum pass through diameter of e.g. less than 500 mm.

It should be noted that the shredded scrap in accordance with the invention may in addition to objects having maximum pass through dimensions in the range of 50-200 mm or 100-180 mm to further include objects having maximum pass through dimensions outside of the range of 50-200 mm or 100-180 mm, e.g. objects of larger maximum dimension and/or objects of smaller maximum dimension. For example, objects having maximum pass through dimensions in the range of 50-100 mm may be present, as well as objects having maximum pass through dimensions in the range of 0-50 mm, and objects having a length transverse to the diameter larger than 200 mm or 180 mm. Preferably a significant number of scrap objects have been shredded coarsely to retain a relatively large size, i.e. a maximum pass through dimension of 100-200 mm or 100-180 mm, to allow for efficient processing. Within this context, the term 'substantially maintaining interspace between objects' is meant to express that the scrap objects are handled in such a way that contact between objects is reduced, minimized or prevented. In particular, it is meant to express that the objects are kept from piling up and/or entangling. Preferably, overlap between objects is prevented in full. However, in practice, maintaining interspace between objects may include that only 90, 80 or 70% of the objects are actually free and non-overlapping.

The classifying step may be carried out by a classifier, i.e. a classifying device, in particular a classifying device arranged for classifying shredded scrap objects into fractions of scrap objects having different size ranges. This classifying step may in particular include determining whether an object surpasses a maximum pass through dimension in a dimensional measuring step using a measuring device. The classifying device may therefore include a classifying arrangement, e.g. a pass-through opening in a sieve deck or a dimension scanner. In the classifying step, objects that supersede a maximum pass through dimension may be put in one class, and objects that subsede or have that maximum pass through dimension may be put in another class. The classifying arrangement of the classifying device may therefore include a first output for scrap objects that are classified to supersede the maximum pass though dimension, and a second output for scrap objects that are classified to subsede or meet the maximum pass though dimension. The assignment to the classes may e.g. be carried out by testing the object's ability to physically pass through a sieve opening of the classifying device, but may also be carried out by an actuator included in the classifying arrangement of the classifying device.

The step of sorting the scrap objects from at least one size range that includes objects having maximum pass through dimensions while substantially maintaining interspace between the objects may be carried out by a sorter, i.e. a sorting device, in particular a sorting device arranged for sorting the scrap objects from at least one size range that includes objects having maximum pass through dimensions while substantially maintaining interspace between the objects. Such sorting device may include an assembly of a conveyor arranged to convey scrap objects in interspace along one or more manipulators, e.g. a conveyor belt arranged to pass along plurality of ejectors.

The steps of classifying and/or sorting are preferably carried out mechanically using a classifier or sorter as set out above, but may alternatively be carried out manually. The classifying step itself may be used to counteract any entanglement that has occurred after shredding. However, to counteract or mitigate entanglement prior to the classifying step the scrap may be shredded with the shredder into interspaced shredded scrap objects and the scrap objects may be fed directly from the shredder to the classifier while substantially maintaining interspace between the objects. This way, a compact and efficient setup may be obtained in which the interspace may be obtained and maintained relatively easily. When the scrap is shredded with the shredder into interspaced shredded scrap objects and when the shredded scrap objects are deposited from the shredder with interspace onto a conveying plane, and when the shredded objects are conveyed to the classifier on the conveying plane while substantially maintaining said interspace between said objects, the shredder may be located further away from the classifier.

The classifier may include a sieve onto which shredded objects are fed, and the classifying step may include sieving the shredded scrap objects into fractions of scrap objects having maximum pas through dimensions of different size ranges. An undersized fraction having dimensions smaller than a maximum pass through dimension, in particular a diameter smaller than a maximum pass through dimension defined by a screen aperture diameter of a sieve deck, may pass through apertures in a sieve deck of the sieve, while an oversized fraction having dimensions larger than a maximum pass through dimension, in particular a diameter larger than a maximum pass through dimension defined by a screen aperture diameter of a sieve deck, may be retained on the sieve deck. The sieve may include several stages to yield a plurality of fractions of different size ranges, e.g., several sieve decks in a row that consecutively have smaller apertures.

By singulating shredded objects from at least one fraction of scrap objects having a particular size range into a row, the scrap objects can be prepared for efficient automated selection. Within this context, singulation is defined as the process of making objects single, in particular, to place objects in a row of single objects, preferably without overlap between consecutive objects in the row, and more preferably with interspace between consecutive objects in the row. In particular, sufficient interspace may be provided between consecutive objects in the row to allow the ejection of individual objects from the row without disturbing the position or velocity of neighboring objects in the row. Fractions of different size ranges may be singulated separately, e.g. in parallel processing lines. For example, shredded objects of both a fraction having a maximum pass through dimension of 50-100 mm and a fraction of a maximum pass through dimension of 100-200 mm or 100-180 mm may be singulated separately in each processing line. Some fractions of size ranges may remain unsingulated, e.g. an 'undersized' fraction of smallest size range, e.g. 0-50 mm pass through dimension, may be buffered as compact bulk, and an 'oversized' fraction of largest size range, e.g. maximum pass through dimension of >200 mm or >180 mm may be returned to the shredder.

The step of sorting scrap objects may further comprise a step of scanning objects. By scanning shredded objects, information may be obtained that is useful for selecting the shredded objects into classes of shredded objects, e.g., information on material, composition, surface constitution, color, and/or shape. Scanning shredded objects after singulation, may facilitate obtaining information on individual objects, and/or processing information partly during a time the interval between subsequent objects to be scanned.

The step of sorting scrap objects may further comprise a step of ejecting objects. By ejecting scrap objects, collecting shredded objects in classes may be facilitated. By ejecting scrap objects after singulation, it may be facilitated to collect individual objects, e.g. by depositing ejected objects of the same class in a bin. By ejecting scrap objects after scanning, preferably scanning after singulation, it may be facilitated to eject scrap objects based on information obtained by the scanning.

To enhance throughput and to retain interspace between the shredded objects, the shredded objects may be conveyed from a singulation arrangement past a scanning arrangement along an ejector arrangement, preferably conveyed continuously.

Scanning the shredded objects may include scanning the appearance, i.e. visual appearance of the exterior in shape, size, form, color and surface constitution. Scanning may include several types of scanners, e.g. both line scanning and a camera. For a line scanning an RGB-camera can be used to produce 2D images of the shredded objects. In order to get more data about the visual appearance, a 3D camera can be used to complement the data of the 2D images or to generate a new image.

Scanning the shredded objects may in alternative or in addition include scanning of other properties, e.g. scanning for the presence of magnetic or magnetizable material, e.g. a steel bolt present in a sectioned aluminum profile as a shredded object. This may e.g. be done by observing excitation of relatively weak magnetic moments as set out in applicant's patent publication WO2020/242298. Scanning may further include testing of the type of material, e.g. using LIBS. This may be done for all shredded objects or for selected objects for which additional information is required for selection, and may be done permanently or during a startup phase only to learn to predict the material type based on visual appearance. Conventional LIBS-modules, short for laser-induced breakdown spectroscopy, can use a highly energetic laser pulse to create a plasma from the targeted material, or the individual shredded objects, and use atomic emission spectroscopy to determine the material composition.

The information on shape may e.g. be used to verify singulation of the shredded objects and/or to estimate the mass and/or calculate the center of gravity for ejection and/or time to ejection.

Timing ejection of selected shredded objects based on scanning and subsequent conveying, e.g. time, speed or distance, allows ejection to proceed without any further scanning and/or visual assistance. For this, the conveyor drive or conveyor itself may e.g. be provided with a timer, e.g. a pulse giver or timing marks.

Scanning may include artificial intelligence and/or deep learning to predict a class that a shredded object belongs to. For example, based on shape and color, a shredded aluminum object may be recognized as sheet metal and classified as Taint Tabor, while another shredded aluminum object may be recognized as a profile section and classified as wrought extruded aluminum, and yet another shredded object may be classified as cast aluminum. Still, another shredded object may be recognized as an aluminum part, but rejected as including a ferrous component. The results from scanning, together with the decision to eject the scrap particle into a specific product bin may be combined to estimate the running average of the alloy composition or grade of the collected scrap in that bin. This information may be used to steer the decision-making for the ejectors towards product bins with pre-defined specifications. Assessing scrap objects based on measured or predicted composition of individual scrap objects and selecting and collecting individual scrap objects based on a running average of measured or predicted composition of scrap objects already collected may be seen as an invention on its own.

The singulation arrangement, scanner arrangement and/or ejector arrangements can be controlled using a common controller, and may e.g. have a common conveyor that the controller also controls.

The first aspect of the invention further relates to a system for recycling scrap comprising a shredder for shredding scrap into shredded scrap objects and a classifier for classifying the shredded scrap objects into fractions of scrap objects having different size ranges, at least one of said size ranges including objects having maximum pass through dimensions in the range of 50-200 mm, preferably 100-180 mm, further comprising a sorter arranged to sort objects from said at least one size range that includes objects having maximum pass through dimensions in the range of 50-200 mm., preferably 100-180 mm while substantially maintaining interspace between the objects.

The shredder may be arranged to shred scrap into interspaced shredded scrap objects and the shredder may be arranged to feed the interspaced shredded scrap objects to the classifier while substantially maintaining interspace between the objects. The shredder may be arranged to feed the interspaced scrap objects directly to the sieve, e.g. an outlet of the shredder may be arranged above an inlet of the classifier.

The system may include a conveyor to feed the interspaced scrap objects to the classifier, the conveyor including a conveyor plane arranged to receive the shredded objects from the shredder with interspace, and to convey the shredded objects to the sieve while maintaining said interspace.

The classifier may be a sieve onto which the shredded objects are fed, which sieve classifies the shredded scrap objects into fractions of scrap objects having different size ranges, at least one of said size ranges including objects having maximum dimensions in the range of 50-200 mm, preferably 100-180 mm.

The sorter may include a singulating arrangement for singulating scrap objects of said at least one size range that includes objects having maximum dimensions in the range of 50-200 mm, preferably 100-180 mm.

The sorter may alternatively or in addition include an ejector arrangement, preferably placed downstream of the singulating arrangement for singulating scrap objects, and/or for ejecting singulated scrap objects.

The system may include a scanner for scanning scrap objects, preferably arranged between the singulating arrangement and the ejector arrangement.

To alleviate the above mentioned disadvantages, a second aspect of the invention relates to a singulating arrangement for singulating scrap objects, comprising a substantially horizontally disposed feeder that extends from a receiving area for receiving scrap objects to a feed gate positioned at a top portion of a chute to feed scrap objects to the chute, the chute having a trough-shaped cross section that includes a base section and sidewalls extending upwardly therefrom, said chute extending downwardly from the top portion to a bottom portion and including a funneled section in which the width of the trough-shaped cross section reduces, said bottom portion of the chute forming an edge gate positioned at a substantially horizontally disposed receiving conveyor to receive objects travelling down the chute.

By funneling scrap objects from a feeder via a downward trough-shaped chute onto a conveyor, scrap objects may be singulated, i.e. be placed consecutively in a row, reliably and efficiently. The singulating arrangement is especially effective for scrap objects that are from equal-sided to relatively elongated shapes, with the length-to-width ratio ranging from, e.g. 1 to 3. The chute may extend from a top portion to bottom portion along a chute axis. The funnel promotes singulation of scrap objects, i.e. that the scrap objects travel down the chute in a row in a conveying direction along the chute axis. The sidewalls of the chute may be slanted upwards to promote alignment of the scrap objects. The feeder may preferably be embodied as a vibrating plate but may as an alternative e.g. be embodied as a conveyor belt. The feeder may be arranged to transport the scrap objects relatively slowly compared to the receiving conveyor belt.

By arranging the receiving conveyor to accelerate the travelling objects upon passing through the edge gate of the chute, singulation is promoted and interspace between subsequent scrap objects may be controlled and/or optimized. The speed of the receiving conveyor in conveying direction may e.g. be arranged to be higher than 1 m/s, preferably higher than 2 m/s, and in particular higher than 3 m/s. The speed of travel of objects in conveying direction on the feeder may e.g. be 0.3 m/s or lower.

By including a convex transition section between the gate of the feeder and the top portion of the chute, singulation may be promoted. Preferably, the convex transition section is arranged between the gate of the feeder and the funneled section of the chute. In the convex transition section, the particles may accelerate strongly to increase the distance between them. After acceleration, the section may contract at the funneled section that preferably extends linearly downwardly. At the funneled section, the particle flow may be forced to converge to a single file. The convex transition section may e.g. be part of the chute, but may alternatively be part of the feeder or may be provided as a separate part.

When the funneled section of the chute extends substantially linearly downward, scrap objects may be accelerated to increase interspace and to promote singulation. The funneled section may e.g. be downwardly inclined at an angle of e.g. 30 degrees or more, preferably 45 degrees or more with respect to the horizontal, and e.g. at an angle of 80 degrees or less, preferably 75 degrees or less with respect to the horizontal.

When the chute includes a concave transition section between the funneled section and the bottom portion, scrap objects travelling down the chute may be decelerated for a smooth transfer to receiving conveyor. In this concave transition section, the particles may push against each other to make space at the lower transport velocity in the chute without getting entangled or overlapped.

As an alternative or in addition, the bottom portion of the chute may be substantially horizontally disposed to facilitate a smooth transfer of scrap objects to the receiving conveyor.

At a gate of the chute, the side walls of the chute may protrude in the direction of travel of the objects beyond the base section and extend to overlap with the conveyor. This way a particularly good transfer of the scrap objects from the chute to the conveyor may be achieved, in particular when the speed of the receiving conveyor is substantially higher than the speed of the objects travelling down the chute.

When the feeder comprises a skirt at the receiving area to decelerate objects received onto the feed plate it may be prevented that scrap objects that are received onto the feed with high velocity can affect other objects on the feed plate and/or pass on to the chute with velocity higher than intended. Such skirt may e.g. initially decelerate the scrap objects received on to the feed plate, by using e.g. one or more rubber flaps that are arranged at a plane transverse to the direction of travel of the scrap objects.

The feeder may include a trough-shaped cross section having a bottom plane and sidewalls extending upwardly therefrom, which cross section tapers towards the feed gate. This way, scrap objects may be fed to the chute at a substantially constant flow and a relatively high density, so that after singulation on a fast-moving receiving conveyor, a sufficiently high and constant throughput remains. Preferably, the cross section of the feeder tapers to the same dimension as the top section of the chute.

The chute may include one or more actuators to act on individual objects travelling down the chute. This way, in case of scrap objects travelling down the chute with an overlap in the transport direction, a trailing object may be decelerated relative to a leading object or a leading object may be accelerated relative to a trailing object. Such actuators may e.g. be provided at the top portion and/or the funneled section of the chute. Such actuators may e.g. include one or more nozzles for jetting water or air, or movable fingers. The actuators may be arranged for temporary direct or indirect engagement of the leading and/or trailing scrap object to accelerate it or to slow it down respectively, or to temporarily reduce or increase friction, e.g. between the object and the chute or between the object and the surrounding air.

The second aspect of the invention further relates to a chute, in particular for a singulating arrangement as discussed above, the chute having a trough shaped cross section that includes a base section and sidewalls extending upwardly therefrom and extending downwardly from the top portion to a bottom portion and including a funneled section in which the width of the trough shaped cross section reduces, the bottom portion of the chute forming an edge gate wherein the funneled section of the chute extends substantially linearly downward and wherein the chute includes a concave transition section between the funneled section of the chute and the bottom portion. The bottom portion of the chute may e.g. be substantially horizontally disposed, and at the gate of the chute the sidewalls may e.g. protrude beyond the base section. The chute may include one or more actuators acting on individual objects traveling down the chute, particularly nozzles and/or movable fingers.

The second aspect of the invention further relates to a method of singulating scrap objects by feeding scrap objects via a downward chute onto a conveyor, in particular using a singulating arrangement or chute as discussed above, the method including the steps of feeding the scrap objects to the chute, funneling objects that travel downward through the chute into a row and accelerating the travelling objects upon passing through the gate of the chute with the conveyor. In case of overlap of a leading and a trailing object in direction of travel, the trailing object may be engaged to decelerate it relative to a leading object.

To alleviate the above mentioned disadvantages, a third aspect of the invention relates to An ejector arrangement, comprising a conveyor with a substantially flat conveying plane and an ejector device disposed along the conveyor, the ejector device being arranged to eject objects from a row of singularized objects travelling in a conveying direction along the conveying plane, the ejector device including a sweeper shoe that is mounted to the ejector device to pivot along a substantially arcuate path about an axis of rotation that extends at interspace above the conveying plane, the sweeper shoe having a bottom portion that is arranged to be driven to pass along the conveying plane in a sweeping path that extends transversely to the conveying direction, wherein the bottom portion of said sweeper shoe is provided with radial compliance relative to the axis of rotation so that when driven to pass along the conveying plane, the sweeping path forms a flattened portion of the arcuate path that extends substantially in or parallel to the conveying plane. In other words, the flattened portion of the arcuate path forms a linear segment of the arcuate path. By providing the sweeper shoe with radial compliance relative to the axis of rotation so that the sweeping path forms a flattened portion of the arcuate path it can be achieved that the ejector may be constructed very cost-effectively with a drive having only a single axis of rotation, e.g. using a single electromotor.

The sweeper shoe may be arranged to be driven to pass along the sweeping path conveying plane without interspace, so as to pass along the conveying surface in contact therewith.

The flattened portion, or linear segment, of the arcuate path may then be obtained by contact between the sweeper shoe and the conveying surface, e.g. by driving bottom of the sweeper shoe to pass along the conveying plane in contact therewith and by providing elastic radial compliance. Elastic radial compliance may be provided through elasticity of the sweeper shoe or other components of the drive. This may allow for the sweeper shoe to deform or displace such that the arcuate path comprises a linear segment, e.g. by having the bottom of the sweeper shoe extend radially further outwards while in motion relative to when the sweeper shoe would follow a circular path. Contact forces between the bottom of the sweeper and the conveying plane may then cause elastic deformation and subsequent spring back of e.g. the shoe itself, so that the bottom of the shoe can follow a flattened, linear, portion of the arcuate path. Elastic radial compliance may as an alternative or in addition also be provided by elastic deformation of other components of a driving arrangement of the sweeper shoe.

The sweeper shoe may be arranged to be driven to pass along the sweeping path conveying plane with interspace, so as to pass along the conveying contactless. Along the sweeping path, a gap may be maintained between the bottom of the sweeper shoe and the conveying plane that is included in the range of 0.1-5 cm, preferably of 0.1-3 cm, more preferably between 0.1-1 cm The flattened portion of the arcuate path that forms the sweeping path may then be obtained by a mechanism of the drive, e.g. a linkage or cam arrangement that dictates a flattened portion of the arcuate path. The flattened portion of the arcuate path may also be obtained by arranging the drive to vary centripetal force on the sweeping shoe to control radial compliance. Preferably, elastic radial compliance may then be provided to act in concert with the controlled centripetal forces, e.g. through elasticity of the sweeper shoe or other components of the drive. The drive may be arranged to drive the sweeper shoe to form the flattened portion of the arcuate path in an increasing velocity phase and a subsequent constant velocity phase of the sweeping path. Radial outward movement of the bottom portion of the sweeper shoe by centrifugal force that override elastic return forces may then be followed by radial inward movement of the bottom portion of the sweeper shoe by elastic return forces that override the centrifugal force. By using an acceleration mode of the drive of the ejector device, the bottom portion of the sweeper shoe may reach out radially until it is near the conveyor belt surface, with a desired gap of e.g. from 0.1 to 1 cm. By subsequently using a constant velocity mode of the drive, the bottom portion of the sweeper shoe will spring back to some extent, which accommodates decrease of the gap as the sweeper shoe rotates further.

The axis of rotation may extend in a plane substantially parallel to the conveying plane so as to facilitate alignment of the sweeping path with the conveying plane.

The axis of rotation may extend obliquely relative to the conveying direction. This way, the sweeping path may include both components transverse to the conveying direction to eject products, but also a component along the conveying direction. This allows the sweeper shoe to travel along with a scrap object to be ejected, so that contact time is increased and ejection may be smooth.

The axis of rotation may extend at an acute angle relative to the conveying direction, e.g. an angle of about 30-60 degrees.

The sweeping path may be centered on a centerline through the row of singularized objects travelling in the conveying direction along the conveying plane.

The sweeper shoe may be arranged for full rotational movement about the axis of rotation in a plane of rotation. This way, the drive of the sweeper shoe may be relatively simple. The plane of rotation may advantageously extend substantially transversely, in particular perpendicularly, to the conveying plane. The plane of rotation may advantageously extend obliquely relative to the conveying direction. The rotational movement may be indexed, and may e.g. be arranged to make ¼, ⅓ or ½ turns.

Subsequent rotational movements may be in opposite rotational direction, so as to sweep back and forth. However, preferably subsequent rotational movements are in the same rotational direction. This allows for continued incremental rotation in the same direction. This way, the sweeper can be repositioned relatively easily.

The ejector device comprises one or more sweeper arms, each sweeper arm carrying a sweeper shoe at a radial outward end. In case of continued incremental rotation in the same direction, a next sweeping shoe may be positioned for subsequent sweeping action in only a small amount of time. In case of two subsequent objects to be ejected travelling down a conveyor at high velocity, e.g. at least 1, 2 or 3 m/s, this is particularly advantageous. The ejector device may be arranged to perform subsequent sweeping actions in less than 1 second, e.g. less than 0.5 second, or even less than 0.3 second. This way, even when scrap object travel at high velocity, a single ejector device can eject subsequent scrap objects to the same bin.

The sweeper arm(s) may e.g. radially extend from a central shaft of which a centerline corresponds to the axis of rotation. The sweeper arms may e.g. be placed at even angular interspace, e.g. 90 degrees.

The sweeper shoe may comprise a flexible body portion. This way, the radial compliance can be implemented relatively simply. The sweeper shoe may be elastically deformable in radial direction, and may in particular be deformable relative to the sweeper arm.

The viscous (or imaginary or loss) part of the Young's modulus is preferably chosen in such a way that a lower edge of the hitting surface of the sweeping shoe moves in a substantially flat line over the conveyor plane in the region where it may hit a scrap particle. In addition, the material is also preferably chosen such that it produces a final position of the lower edge at the end of the arcuate path that is sufficiently close to a static equilibrium position to make the profile of a next sweep essentially independent of the time interval between two consecutive sweeps. The viscous part of Young's modulus is therefore preferably chosen to be neither too small or too large. It was found that convenient values for the viscous part of the Young's modulus may lead to heating of the sweeper shoe by 10-30° C. if the sweeper shoe is used continuously. In order to limit variations in the arcuate path of the lower edge of the hitting plane of the shoe, the material for the shoe is preferably chosen such that the Young's modulus should not differ by more than 40% and preferably not more than 20% over a working temperature range, including the effect of the variation of ambient temperature as well as the effect of visco-elastic heating. The real and imaginary components of the Young's modulus of the elastic material of the sweeper shoe thus vary less than 40%, preferably less than 20% over a temperature working range of the shoe ranging from 0° C.-50° C., preferably 10° C.-40° C. A suitable material for the sweeper shoe is e.g. car tire rubber.

When the sweeper shoe comprises a profile having an open cross section, the radial compliance can be implemented especially simply, reliably and cost effectively.

When the sweeper shoe has a planar hitting surface that is arranged to extend in or parallel to the conveying direction in a plane substantially transversely to the conveying plane it may be achieved that the hitting surface extends along the scrap object travelling in the conveying direction. The hitting surface may advantageously extend transversely, in particular perpendicularly to the conveying surface at centerline of the row of singularized objects travelling in the conveying direction.

Specifically advantageously, the sweeper shoe may comprise a flexible body portion formed as a substantially C or G-shaped profile, a bottom of the C or G-shaped profile arranged to form the bottom portion of the sweeper shoe and an end face of the C or G-shaped profile forming the hitting surface.

The third aspect of the invention further relates to an ejector device including a sweeper shoe that is mounted to the ejector device to pivot along a substantially arcuate path about an axis of rotation, the sweeper shoe having a bottom portion that is arranged to be driven to pass along a conveying plane, wherein the bottom portion of said sweeper shoe is provided with radial compliance relative to the axis of rotation so that when driven to pass along the conveying plane, the sweeping path forms a flattened portion of the arcuate path that extends substantially in or parallel to the conveying plane. The ejector device may comprise one or more sweeper arms that radially extend from a central shaft of which a centerline corresponds to the axis of rotation, each sweeper arm carrying a sweeper shoe at a radial outward end, wherein the sweeper shoe has a planar hitting surface that is arranged to extend at an acute angle to the axis of rotation. The sweeper shoe may comprise a flexible body portion formed as a substantially C or G-shaped profile so as to be elastically deformable in the radial direction relative to the sweeper arm, a bottom of the C or G-shaped profile arranged to form the bottom portion of the sweeper shoe and an end face of the C or G-shaped profile forming a hitting surface of the sweeper shoe.

In addition, the third aspect of the invention relates to a method of ejecting objects from a row of singularized objects travelling in a conveying direction along the conveying plane, wherein a sweeper shoe is pivoted along a substantially arcuate path about an axis of rotation that extends at interspace above the conveying plane and wherein a bottom portion of the sweeper shoe is driven to pass along engages the conveying plane in a sweeping path that extends transversely to the conveying direction through the row of objects, wherein when driven to pass along the conveying plane a bottom portion of said sweeper shoe is radially displaced relative to the axis of rotation so that the sweeping path forms a flattened portion of the arcuate path that extends substantially in or parallel to the conveying plane, and wherein a hitting surface of the sweeper shoe engages an object to eject if from the row.

As set out above, the sweeper shoe may be driven to pass along the sweeping path conveying plane without interspace, so as to pass along the conveying surface in contact therewith. To prevent wear and to increase reliability, the sweeper shoe may however be driven to pass along the conveying plane with interspace, so as to pass along the conveying contactless. The sweeping shoe may be driven to vary centripetal force on the sweeping shoe to control radial compliance so as to form the flattened portion of the arcuate path. To form the flattened portion of the arcuate path the sweeper shoe may be driven in an increasing velocity phase and a subsequent constant velocity phase of the sweeping path. Radial outward movement of the bottom portion of the sweeper shoe by centrifugal force that override elastic return forces may then be followed by radial inward movement of the bottom portion of the sweeper shoe by elastic return forces that override the centrifugal force. Subsequent sweeping actions may be performed by the same ejector device in less than 1 second, e.g. less than 0.5 second, or even less than 0.3 second.

The hitting surface of the sweeping shoe may be arranged to extend in or parallel to the conveying direction in a plane. The hitting surface may extend transversely, in particular perpendicular to the conveying surface at centerline of the row of singularized objects travelling in the conveying direction.

The above aspects of the invention individually alleviate disadvantages of manual sorting, and in combination alleviate disadvantages further. The aspects of the invention together form an invention, but may each individually also be seen as inventions on their own.

The invention will further be elucidated on the basis of exemplary embodiments which are represented in the drawings. The exemplary embodiments are given by way of non-limitative illustration of the invention.

Figure 7A:
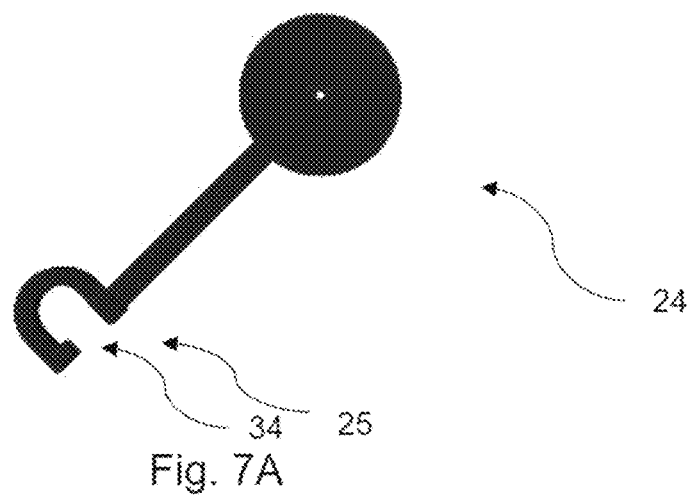
Figure 8:
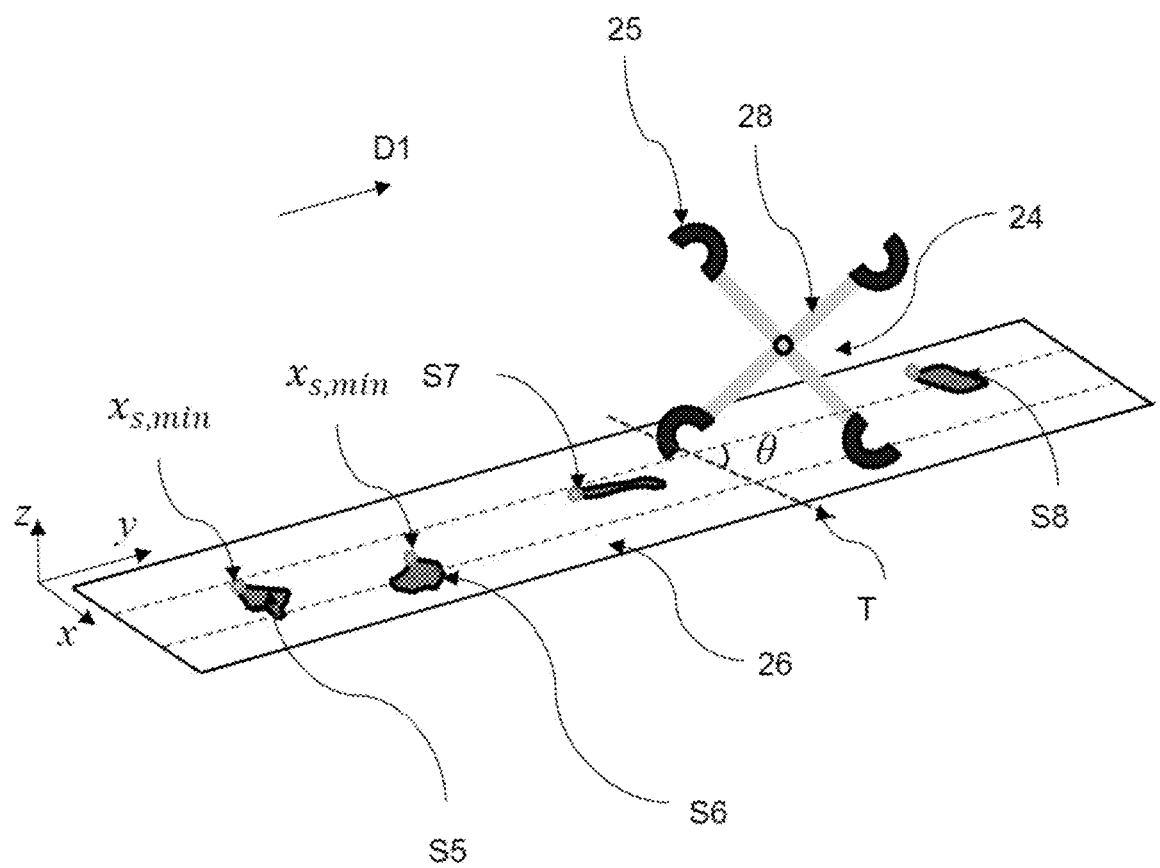
Figure 9A:
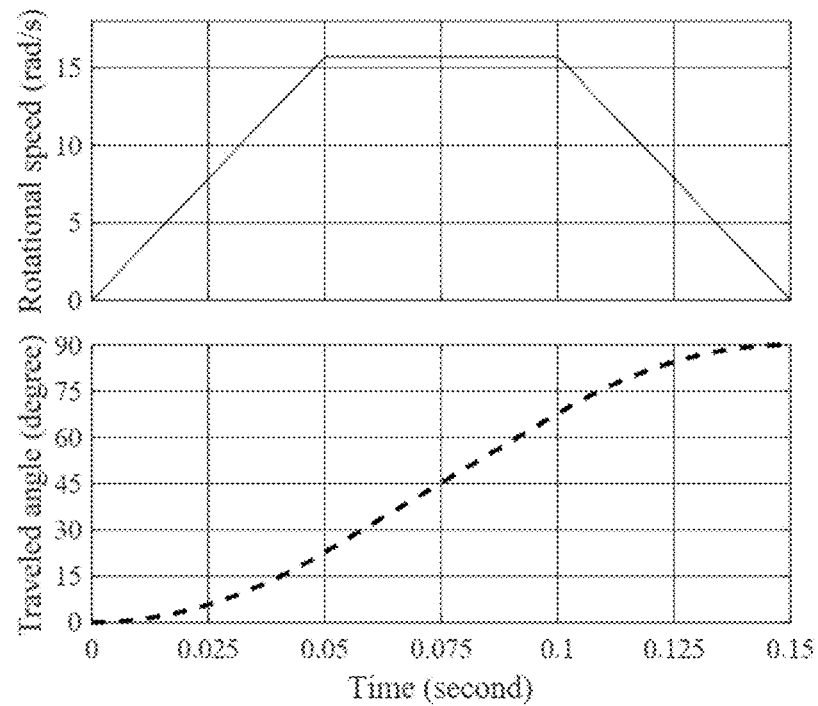
Figure 9B:
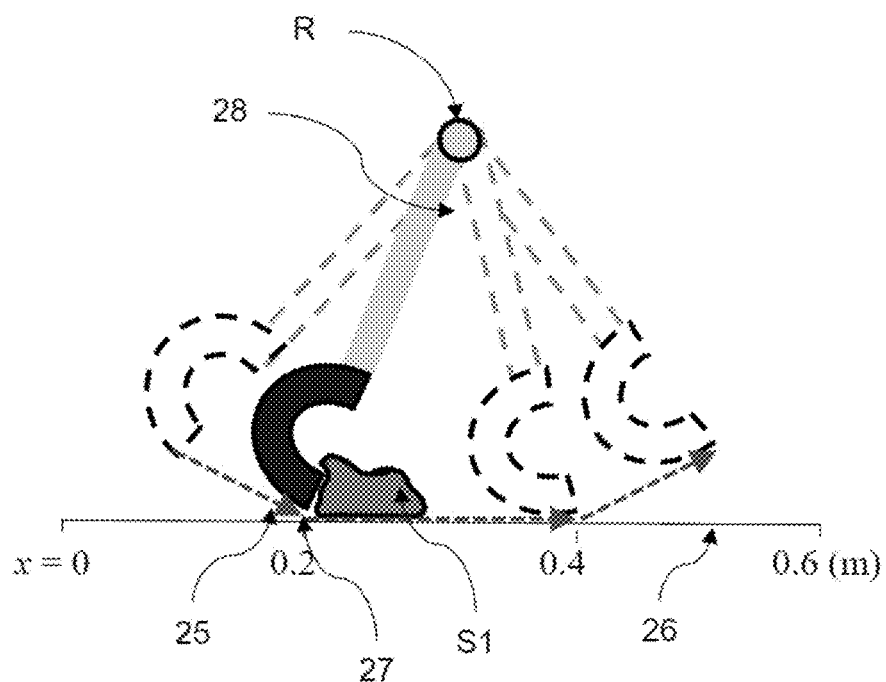
Figure 10A:
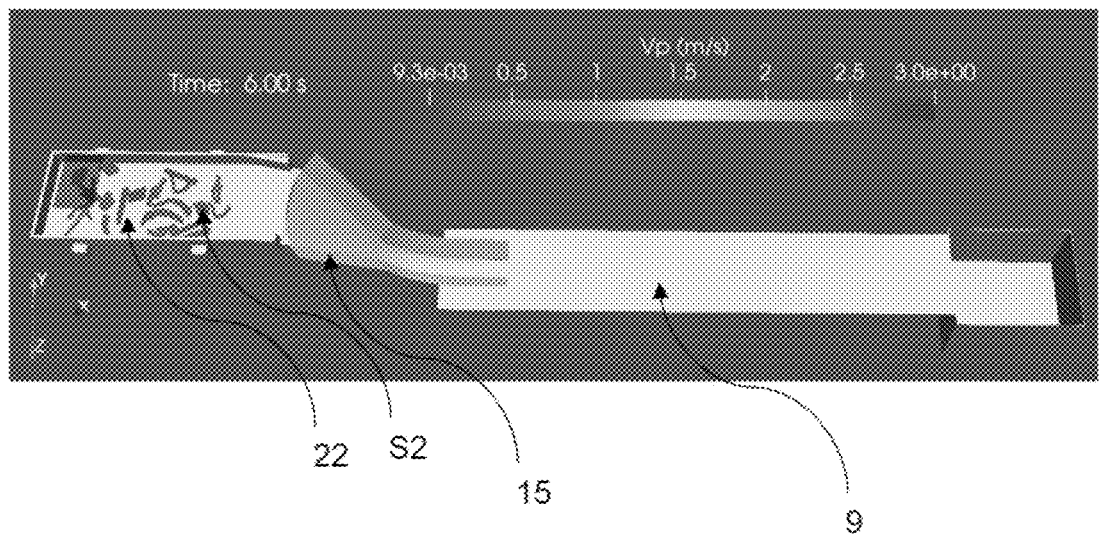
Figure 10B:
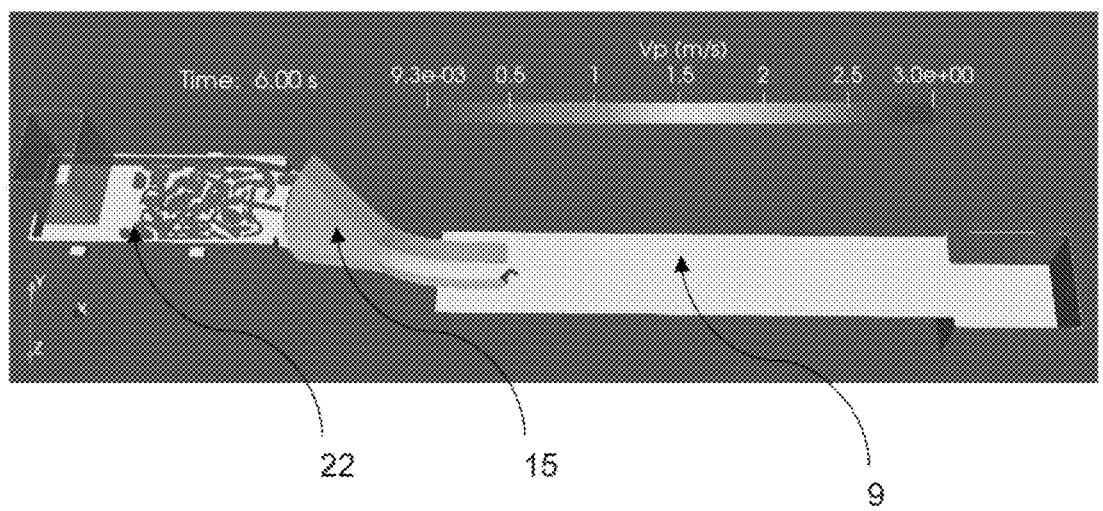
Figure 11A:
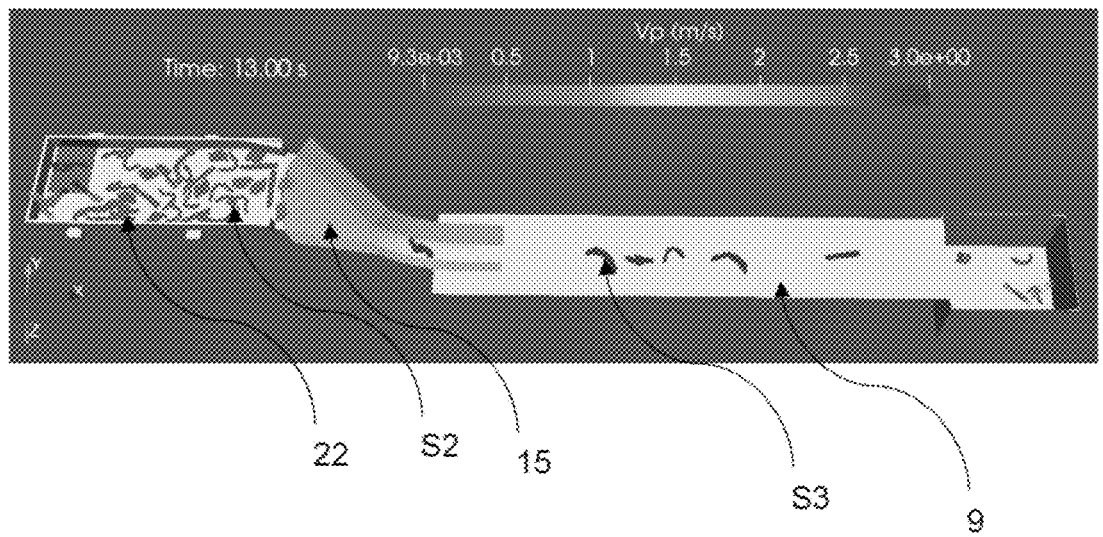
Figure 11B:
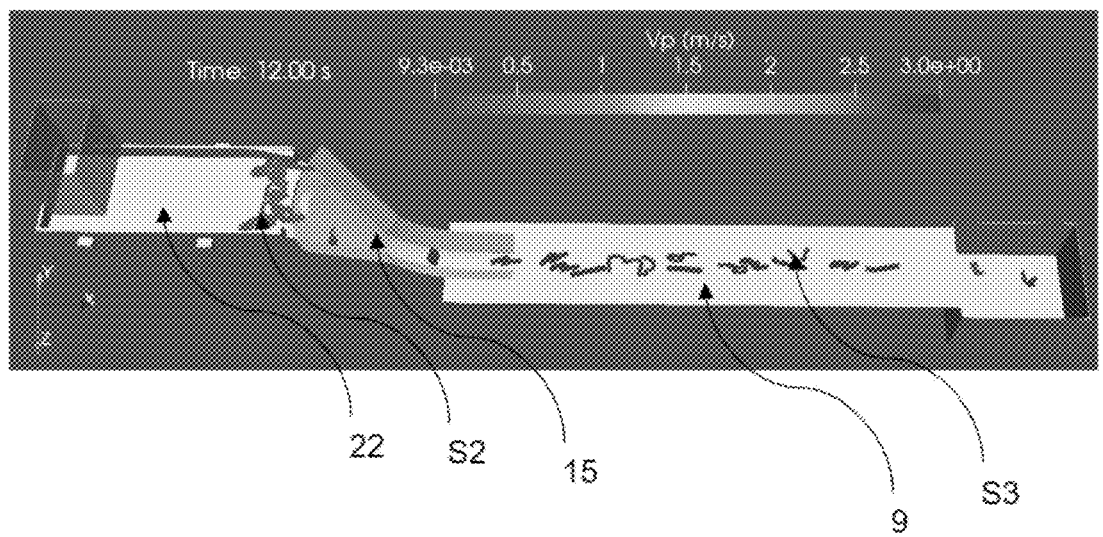
Figure 12A:
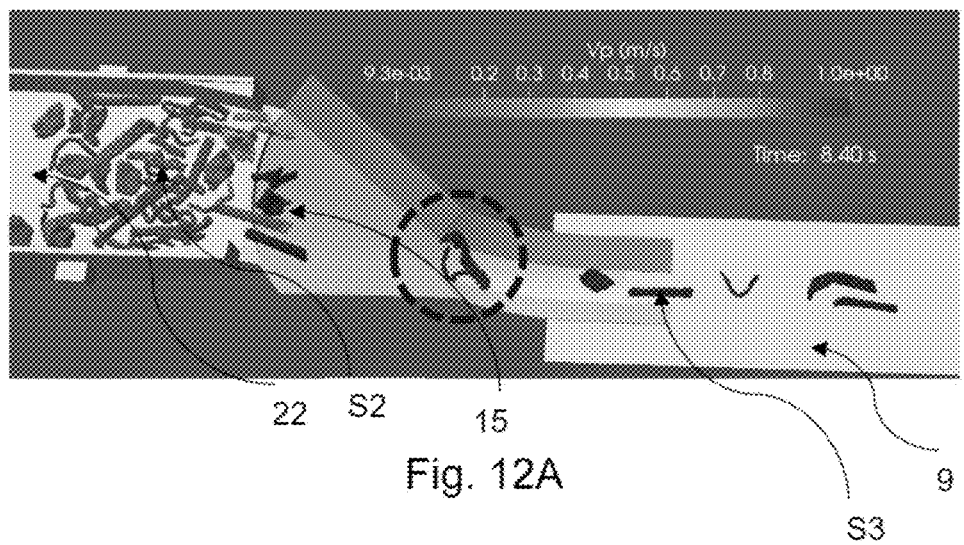
Figure 12B:
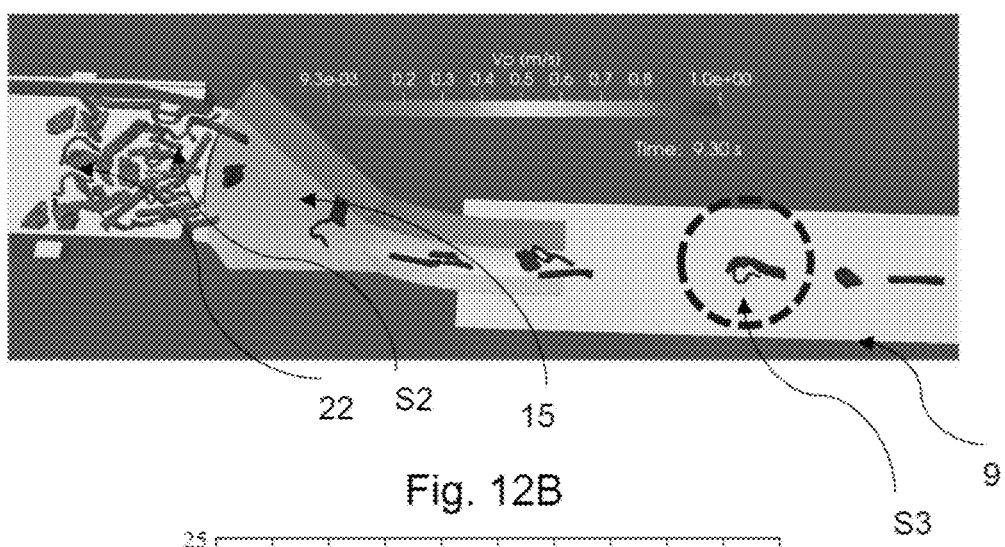
Figure 12C:
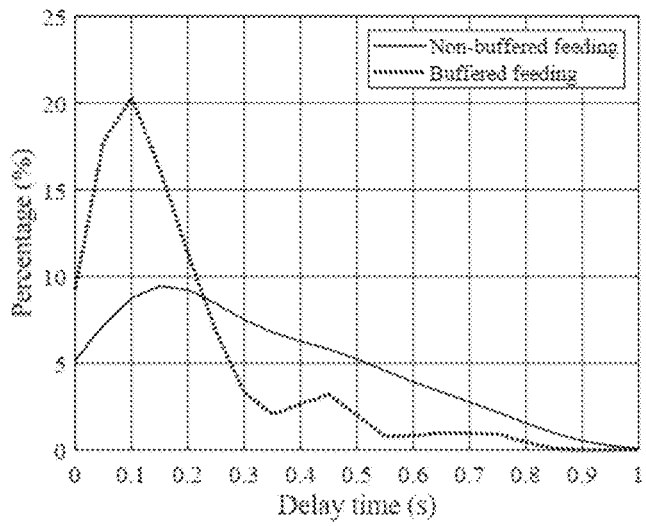
Figure 13:
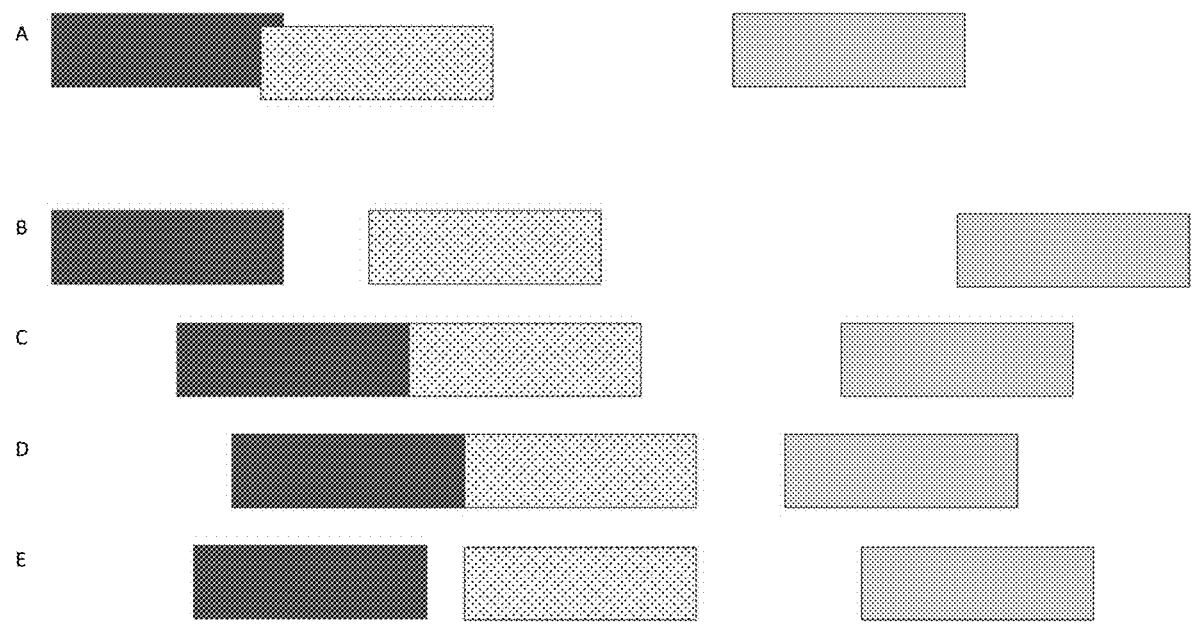

FIGS. 7A, B and C shows an isometric view of a sweeper shoe of the ejection arrangement;

FIG. 8 shows a schematic overview of an experiment with the ejection arrangement;

FIG. 9A shows two graphs describing the rotational speed and the traveled angle of a sweeper shoe of the ejection arrangement used in the experiment of FIG. 8;

FIG. 9B shows a flattened, linear, portion of the arcuate path of the sweeper shoe of the ejection arrangement used in the experiment of FIG. 8;

FIG. 10A shows a numerical experiment in which scrap is not buffered before being fed to a chute after a runtime of 6 seconds;

FIG. 10B shows a numerical experiment in which the scrap is buffered before being fed to a chute after a runtime of 6 seconds;

FIG. 11A shows the experiment of FIG. 10A after a runtime of 13 seconds;

FIG. 11B shows the experiment of FIG. 10B after a runtime of 12 seconds;

FIG. 12A shows the experiment of FIG. 10A after a runtime of 8.4 seconds;

FIG. 12B shows the experiment of FIG. 10B after a runtime of 9.3 seconds;

FIG. 12C shows the percentage of scrap as a function of the delay time for experiments of FIG. 10A and FIG. 10B;

FIG. 13 shows a schematic diagram showing relative positions of scrap particles without a chute and at different positions in the chute and on a conveyor belt.

It is noted that the figures are only schematic representations that are given by way of non-limited examples. In the figures, the same or corresponding parts are designated with the same reference numerals.

Figure 1:
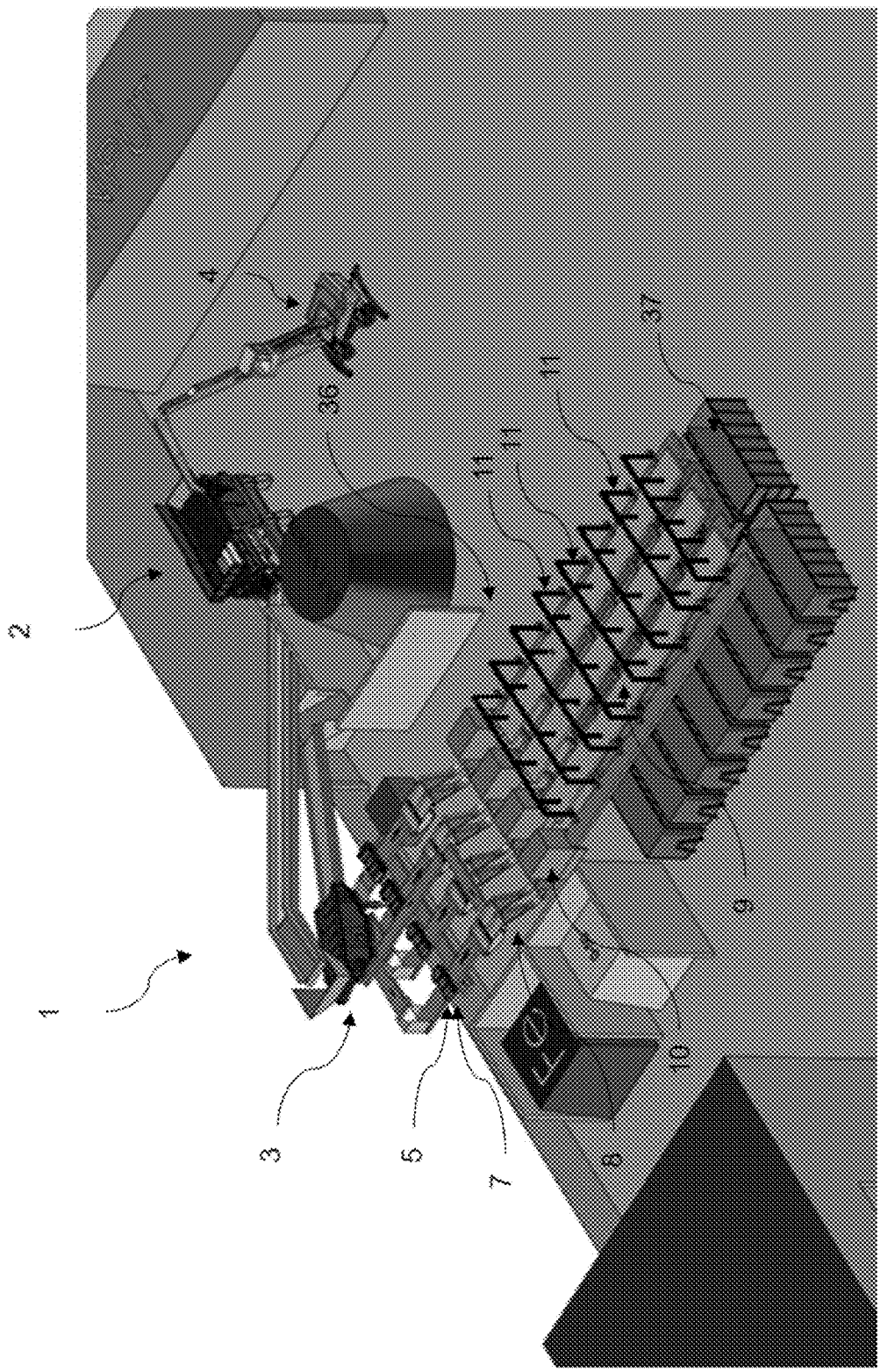
FIG. 1 shows an isometric overview of an example of a system for recycling scrap.
Figure 2:
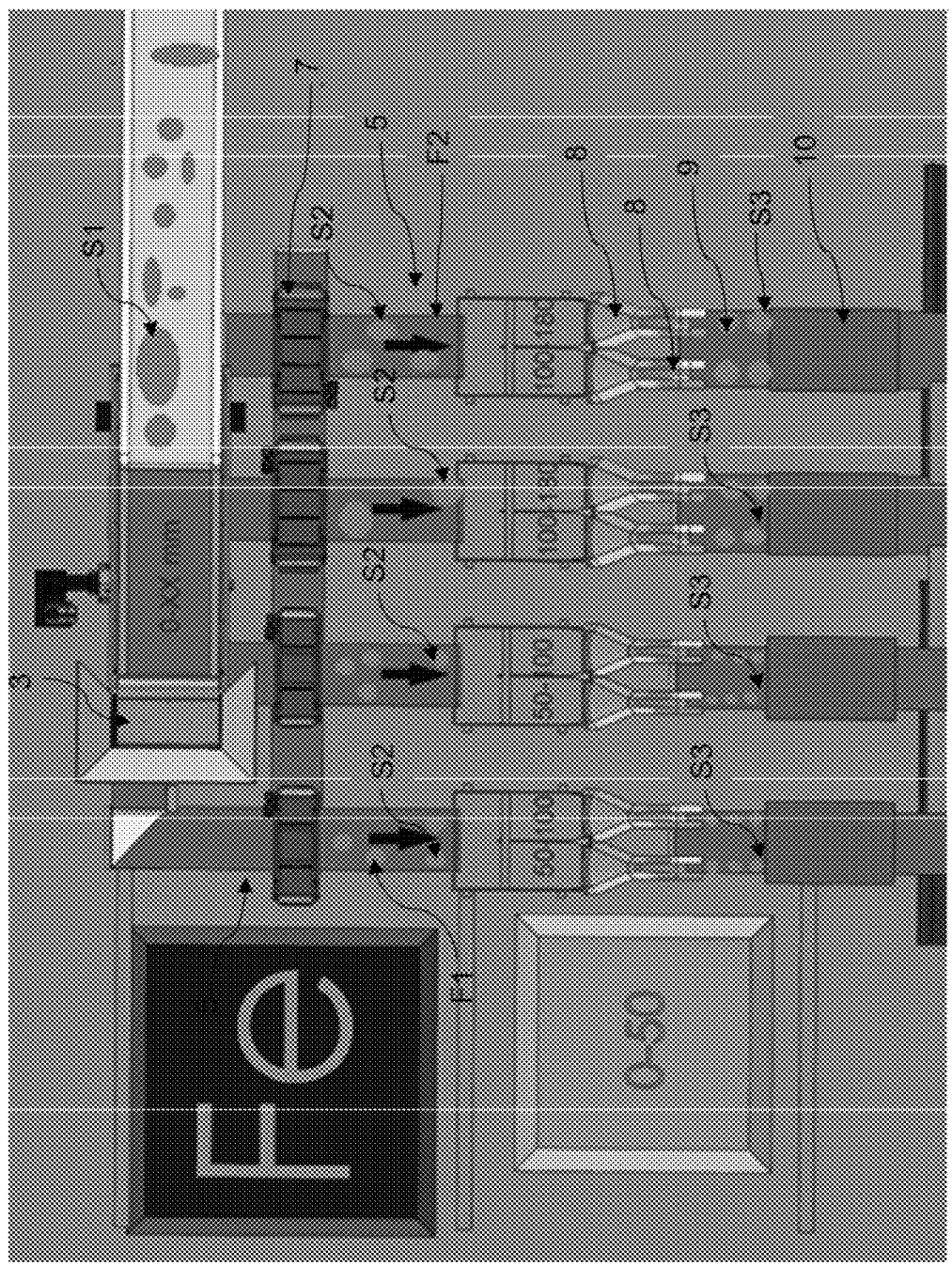
FIG. 2 shows a top view of a section of the system for recycling scrap.

FIGS. 1 and 2 show a system 1 for recycling scrap, in this example aluminum scrap. The system 1 comprises a shredder 2 for shredding scrap S1 into interspaced shredded scrap objects S2. The system 1 further comprises a classifier 3 for classifying the shredded scrap objects S2 into fractions of scrap objects S2 having different size ranges. In this example, at least one of the size ranges includes objects having maximum pass through dimensions in the range of 100-180 mm. The system 1 further comprises a sorter 36 arranged to sort objects from the size range that includes objects having maximum pass through dimensions in the range of 100-180 mm while substantially maintaining interspace between the objects S2. The shredder 2 is arranged to feed the classifier 3 while substantially maintaining interspace between the objects.

The shredder 2 shown in the current example is a conventional shredder 2 of the type commonly used in the metal recycling industry. Such a shredder 2 can be fed with scrap, for example via a crane 4. The interspaced shredded scrap objects S2 preferably have maximum dimensions in the range of 100-200 mm, in particular 100-180 mm. In the shown example a significant number of scrap objects S2 have been shredded coarsely to retain a relatively large size, i.e. a significant portion of the objects has a maximum pass through dimensions of 100-180 mm, to allow for efficient processing.

Figure 3:
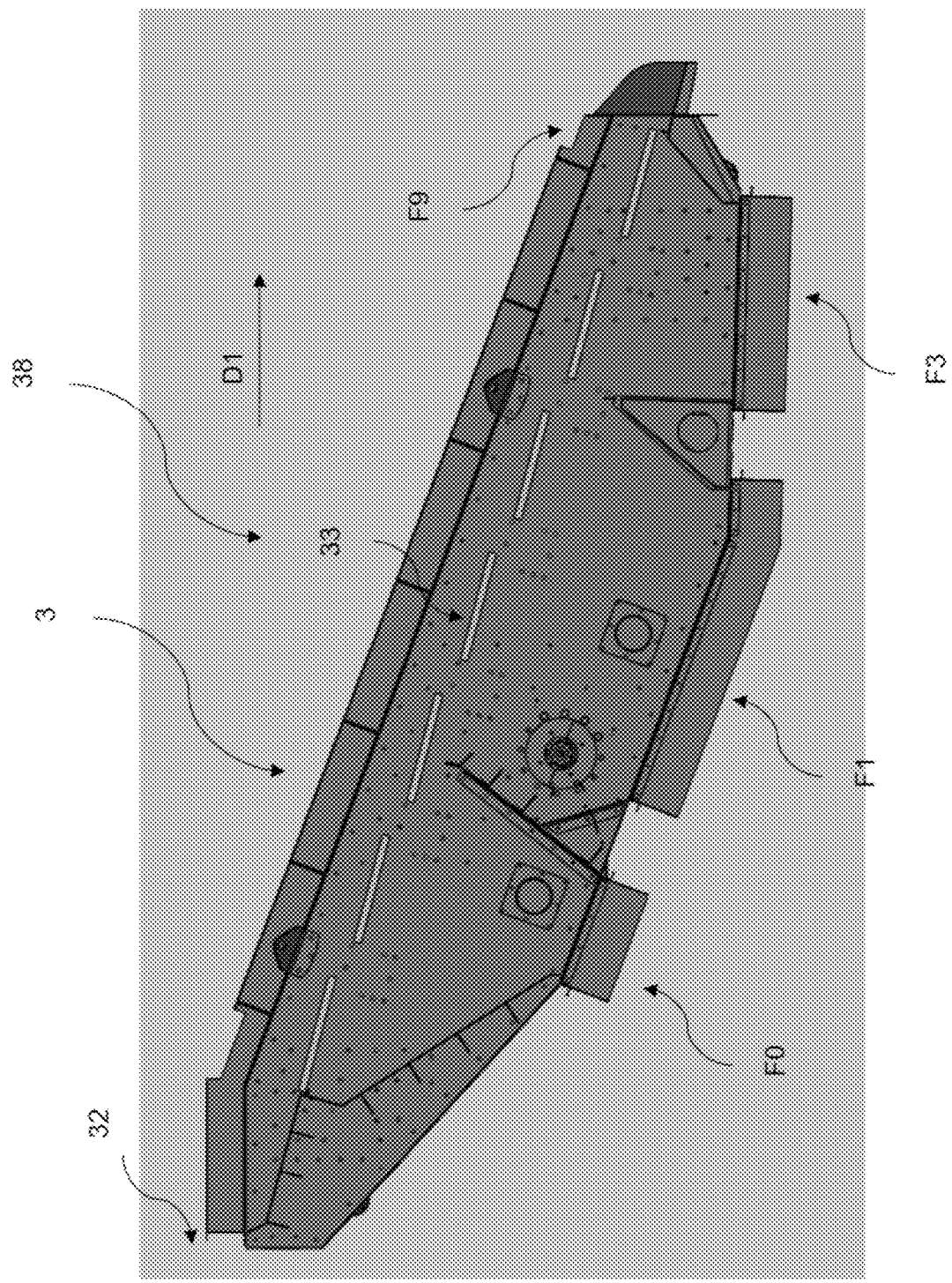
FIG. 3 shows a cross-sectional side view of a classifier.

FIG. 3 shows the classifier 3 which includes a sieve 38 having several sieve decks 33 onto which the shredded objects are subsequently fed. The classifying step includes sieving the shredded scrap objects S2 into fractions of scrap objects S2 having maximum pas through dimensions of different size ranges. An undersized fraction having dimensions smaller than a maximum pass through dimension, in particular a diameter smaller than a maximum pass through dimension defined by a screen aperture diameter of a sieve deck 33 pass through apertures in a sieve deck 33 of the sieve, while an oversized fraction having dimensions larger than a maximum pass through dimension, in particular a diameter larger than a maximum pass through dimension defined by a screen aperture diameter of a sieve deck 33, are be retained on the sieve deck 33. The sieve 33 thus includes several stages to yield a plurality of fractions of different size ranges, e.g., several sieve decks in a row that consecutively have smaller apertures. In the context of the current example, 'classified' should be interpreted as separating the scrap objects S2 in various fractions based on their size. If the shredded scrap objects S2 are considered to be out of range, either being too small or too large, they are separated in an early stage of the recycling process. Oversized shredded scrap objects S2 are too large to pass through the sieve deck and are fed back again to the shredder 2. Undersized shredded scrap objects S2 considered too small for singulation are stored compactly in bulk in a conventional way.

In the shown example, classifier 3 is fed with shredded objects S2 that are being transported in a direction D1, starting from the sieve feed 32.

The maximum pass through dimensions here are a maximum diameter of the object, allowing objects of a maximum diameter irrespective of a maximum length transverse to the diameter to pass. The length may thus be smaller than, equal to or greater than the diameter. To facilitate handling during the sorting the objects S2 have maximum dimensions in absolute sense, e.g. a length transverse to a maximum pass through diameter of e.g. less than 500 mm.

The smallest of the scrap objects S2, having a pass-through dimension range of 0-50 mm, forms the undersized fraction F0 and falls through the sieve deck 33 that comprises apertures of 50 mm. This fraction F0 is considered to be too small for singulation, and is being stored compactly in bulk in a conventional way. The remaining scrap objects S2, have a pass-through dimension larger than 50 mm, are being transported further in direction D1. The next fraction F1 of scrap objects S2 has a maximum pass through range from 50-100 mm, and is classified, or fractionated, by the sieve deck 33 having apertures of 100 mm. This fraction F1 is the first fraction that is used for singulation. The remaining scrap objects S2, having a maximum diameter of at least 100 mm is fractionated in scrap objects S2 having a range of 100-180 mm. This is done using a sieve deck 33 with apertures of 180 mm in diameter. This fraction F2 is the second fraction that is used for singulation. The remaining scrap objects S2, having a maximum pass through diameter of least 180 mm, are considered an oversized fraction F9 and are fed again to the shredder 2. The first fraction F1 and second fraction F2 are placed, for example by falling, on the feed conveyor belt 5 for further transportation downstream.

In the shown example, the classifier 3 feeds four different feeding conveyor belts 5. Two of the feeding conveyor belts 5 are used for a lower subrange of the acceptable scrap range, two other feeding conveyor belts 5 are used for the remaining subrange of the acceptable scrap range.

In the present example, the shredder 2 is arranged to feed the scrap objects S2 via a feeding conveyor belt 5 to the classifier 3. The shredded scrap objects S2 are deposited from the shredder 2 with interspace onto a conveying plane 6 of the feeding conveyor belt 5, and the shredded scrap objects S2 are conveyed to the classifier 3 on the conveying plane 26 while substantially maintaining said interspace between said objects S2.

In the example, after the classifier 3 has classified the shredded scrap objects S2 into different fractions depending on their diameter, a magnet 7 is provided above the feeding conveyor belt 5 to separate remaining ferromagnetic scrap, such as iron, from the shredded scrap objects S2. The magnet 7 is preferably a deep field permanent magnet or an electro magnet. The separated ferromagnetic scrap is then removed from the shredded scrap objects S2 by placing it, for example, in a separate container or pile.

The step of sorting the scrap objects S2 from the size range that includes objects having maximum pass through dimensions of 100-180 mm, comprises a step of singulating shredded objects S2 from said fraction of scrap objects into a row. Thereto, the system 1 further includes a singulating arrangement 8 arranged for singulating the scrap objects S2. The singulating arrangement 8 places the scrap objects S2 in a row of single scrap objects S2, without overlap between consecutive scrap objects S2 in the row, and with interspace between consecutive scrap objects S2 in the row.

In the shown example, two singulating arrangements 8 are provided in parallel per receiving conveyor 9. A detailed example of the singulating arrangement 8 will be discussed further below.

Downstream of the singulating arrangement, the system 1 includes a scanner 10 for scanning scrap objects S2. Scanning the scrap objects S2 here serves a dual purpose: locating individual scrap objects S2 and their position on the receiving conveyor belt 9 and determining the composition of the material.

In the shown example, an RGB line scanner and a 3D camera are used to generate visual data. The visual data is processed by a computer program to determine the location of the scrap objects S2 and the material composition. More specifically, the computer algorithm determines from visual data of the scrap objects S2, such as color, shape and surface condition, the composition of the scrap objects S2.

In the shown example, the computer algorithm is a self-learning computer algorithm arranged to improve the accuracy of determining the material composition of the scrap objects S2. A laser-induced breakdown spectroscopy (LIBS) module is provided to support the self-learning of the computer algorithm. In case the computer algorithm is not able to determine the material composition of the scrap objects S2 from the visual data, for example because the visual data for a type of scrap object has not been sufficiently analyzed by the computer algorithm before or the visual data is provided to the algorithm is not sufficient for any reason, the LIBS-module is used to determine the material composition of the scrap object. The data generated by the LIBS-module is then used as input for the self-learning computer algorithm to improve the accuracy of determining the accuracy of determining the scrap objects S2.

The LIBS-module uses a highly energetic laser pulse to create a plasma from a targeted scrap object, and uses atomic emission spectroscopy to determine the material composition. The LIBS-module may be used permanently, or may be present only during a teaching phase for learning to determine or rather 'predict' the composition of a type of scrap object based on its visual data.

The positional and material data can be combined for each individual scrap object and serves as input data further downstream the scrap recycling system 1.

The system 1 further includes a plurality of ejector arrangements 11 placed downstream of the singulating arrangement 8, and downstream of the scanner 10, for ejecting singulated scrap objects S3. In the shown example, eight ejector arrangements 11 are provided per receiving conveyor 9, however it will be obvious to the person skilled in the arts that any number of ejector arrangements 11 can be provided, e.g. depending on the number of classes the scrap objects are to be sorted into. In the example, each ejector arrangement ejects scrap objects of one class into one bin 37. The scanned data of the scanner 10 is used to determine when to actuate the ejector arrangements 11, based on their material composition. For example, a first ejector arrangement 11 may be actuated if the individual scrap object comprises of a certain amount of magnesium. The data determined by the scanner 10 will allow the ejector arrangement 11 to be actuated at the correct time, such that the correct individual scrap object S3 is ejected. A detailed example of the ejector arrangement 11 will be discussed further below.

FIG. 3 shows a singulating arrangement 8 for singulating scrap objects S2. The arrangement comprises a substantially horizontally disposed feeder 12, that extends from a receiving area 13, for receiving scrap objects, to a feed gate 14 positioned at a top portion 18 of a chute 15 to feed scrap objects to the chute 15. The chute 15 has a trough-shaped cross section that includes a base section 35 and side walls 16 extending upwardly therefrom. Furthermore, the chute 15 extends downwardly from the top portion 18 to a bottom portion 19 and includes a funneled section 17 in which the width of the trough-shaped cross section reduces. The bottom portion 19 of the chute 15 forms an edge gate 20 positioned at a substantially horizontally disposed receiving conveyor to receive objects travelling down the chute 15.

In the shown example, the substantially horizontally disposed feeder 12 is a vibratory feeder. The feeder 12 includes a through-shaped cross section that has a bottom plane and side walls 16 extending upwardly therefrom and the cross-section tapers towards the feed gate 14. In addition, the feeder 12 has a skirt 21 at the receiving area 13 to decelerate objects received onto the feed plate 22. The feeder 12 is arranged to vibrate, which can cause the shredded scrap objects S2 to untangle if they are entangled and feed the shredded scrap S2 relatively slowly compared to the feeding conveyor belt 5, further promoting interspace between scrap objects S2.

Funneling scrap objects from the vibrating feeder 12 via the downward through shaped chute 15 onto the receiving conveyor belt 9, the scrap objects S2 are singulated. In other words, the scrap objects S2 are placed consecutively in a row with desired interspace.

In order to provide a relative smooth transition from the feeder 12 to the chute 15 and the chute 15 to the receiving conveyor 9, a convex and a concave transition sections are provided. More specifically, between the gate 14 of the feeder 12 and the top portion 18 of the chute 15 the convex transition section is located and the concave transition section is located between the funneled section 17 and the bottom portion 19 of the chute 15.

Between the transition sections, the funneled section 17 of the chute 15 extends substantially linearly downward, to accelerate the scrap objects S2 to increase their interspace and further promote their singulation. In the shown example, the chute 15 axis is downwardly inclined at angle $\alpha$ between 45 and 75 degrees with respect to the horizon.

The chute 15 includes one or more actuators 23 to act on individual objects S2 travelling down the chute 15, for example nozzles and/or movable fingers. In case of overlap of a leading and a trailing object in the direction of travel, the trailing object is engaged to decelerate it relative to the leading object, and/or the leading object may be accelerated relative to the trailing object. The bottom portion 19 of the chute 15 is substantially horizontally disposed. At the gate of the chute 15 the side walls 16 may protrude beyond the base section 35 (not shown).

The side walls 16 at the gate of the chute 15 protrude in the direction of travel of the objects, beyond the base section 35, and extend to overlap with the receiving conveyor 9.

The receiving conveyor belt 9 is arranged to accelerate the traveling objects upon passing through the gate of the chute 15. In the shown example, this is done by having the receiving conveyor belt 9 operate at a speed in the conveying direction P that is higher than the speed the scrap objects S2 have on average at the bottom of the chute 15. In this example, the speed of the conveyor belt 9 in conveying direction P is 3 m/s.

Figure 4:
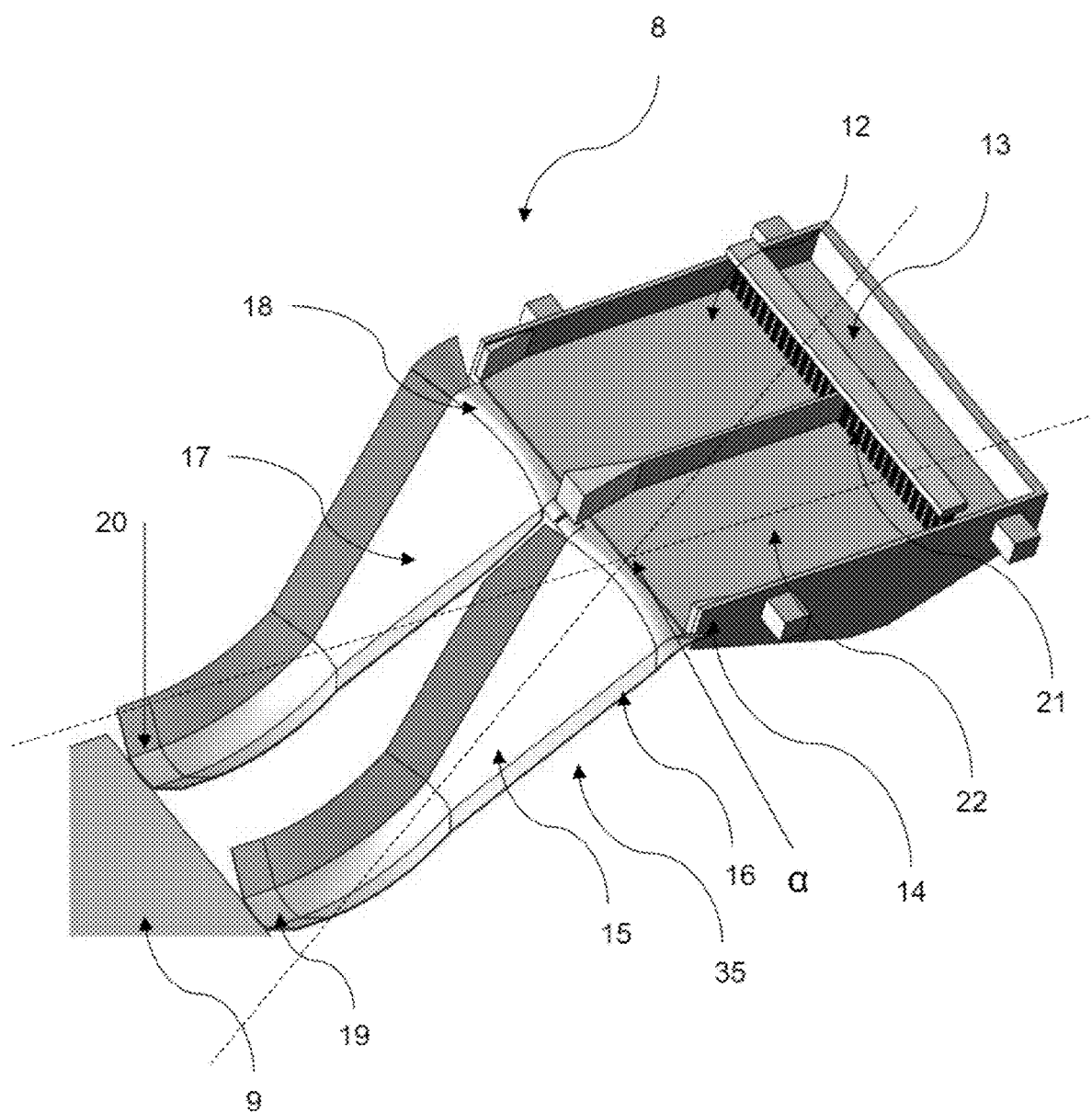
FIG. 4 shows an isometric view of two singulation arrangements.
Figure 5:
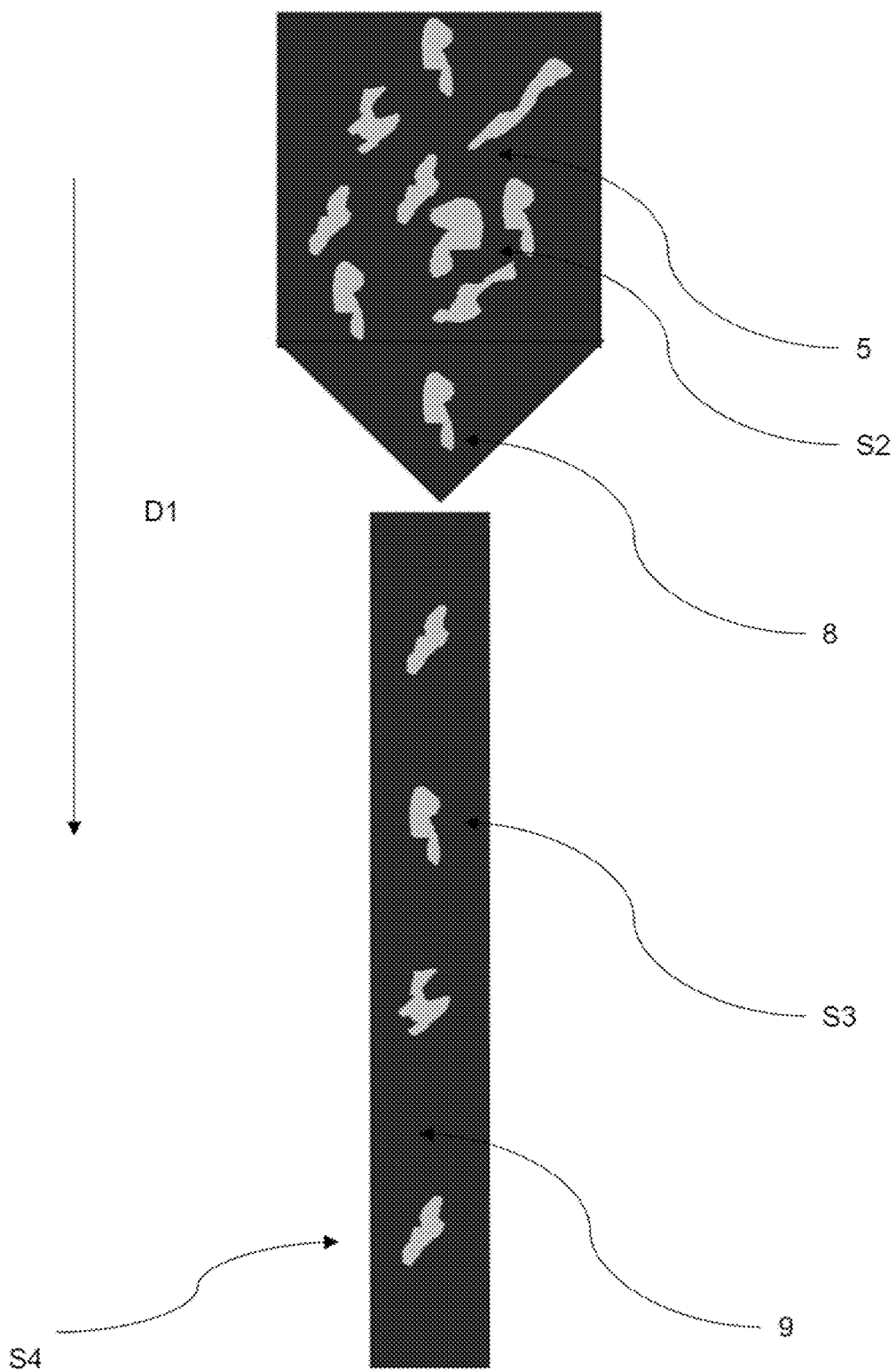
FIG. 5 shows a schematic overview of the singulation process.
Figure 6:
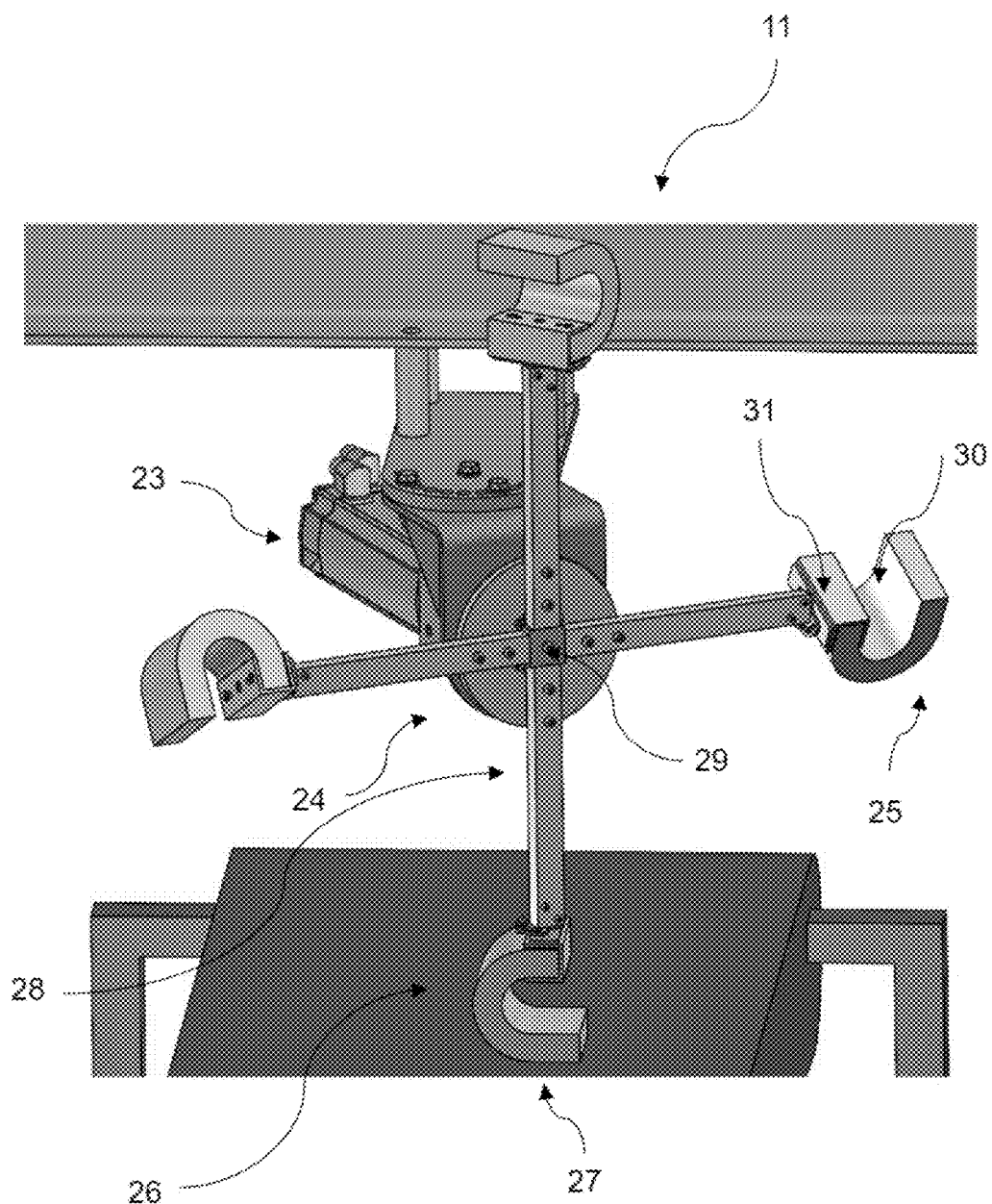
FIG. 6 shows an isometric view of an ejection arrangement.

FIG. 4 shows an ejector arrangement 11, comprising a conveyor 9 with a substantially flat conveying plane 26 and a number of ejector devices 24 disposed along the conveyor 9. The ejector device 24 is arranged to eject objects S4 from a row of singularized objects S3 travelling in the conveying direction P along the conveying plane 26. The ejector device 24 includes a sweeper shoe 25 that is mounted to the ejector device 24 to pivot along a substantially arcuate path about an axis of rotation R that extends at interspace above the conveying plane 26. The sweeper shoe 25 has a bottom portion 27 that in this embodiment is arranged to be driven to pass contactlessly along the conveying plane 26 in a sweeping path that extends transversely to the conveying direction P. The bottom portion 27 of the sweeper shoe 25 is in this embodiment provided with elastic radial compliance relative to the axis of rotation R so that the sweeping path forms a flattened portion of the arcuate path that extends substantially in or parallel to the conveying plane 26.

The ejector device 24 comprises one or more sweeper arms 28, each sweeper arm 28 carrying the sweeper shoe 25 at a radial outward end and radially extending from a central shaft 29 of which a centerline corresponds to the axis of rotation R.

The sweeper shoe 25 is arranged for full rotational movement about an axis of rotation R in a plane of rotation. The axis of rotation R extends obliquely relative to the conveying direction P. The sweeper shoe 25 is rotated in a plane of rotation in an indexed rotational movement, wherein each subsequent rotational movement is in the same rotational direction.

The sweeper shoe 25 comprises a flexible body portion 30 and is elastically deformable in radial direction. In addition, the sweeper shoe 25 comprises a profile having an open cross section. In the shown example, the flexible body portion 30 is formed as a substantially G-shaped profile. The bottom 27 of the G-shaped profile arranged to form the bottom portion 27 of the sweeper shoe 25 and an end face of the G-shaped profile forming a planar hitting surface 31.

The planar hitting surface 31 is in the flattened portion of the sweeping path arranged to extend in or parallel to the conveying direction P in a plane substantially transversely to the conveying plane. More specifically, the hitting surface 31 is arranged transversely, in particular perpendicular to the conveying surface at centerline of the row of singularized objects travelling in the conveying direction P.

The sweeping path is centered on a centerline through the row of singularized objects travelling in the conveying direction P along the conveying plane 26.

Figure 7B:
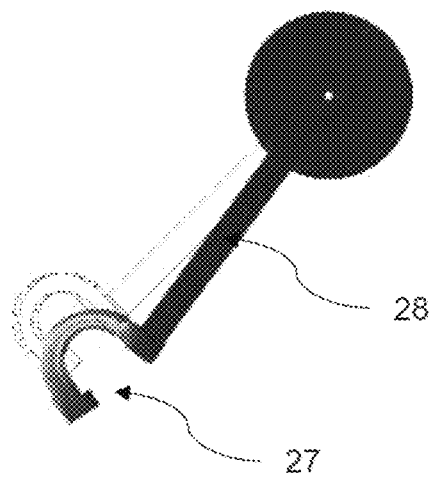
Figure 7C:
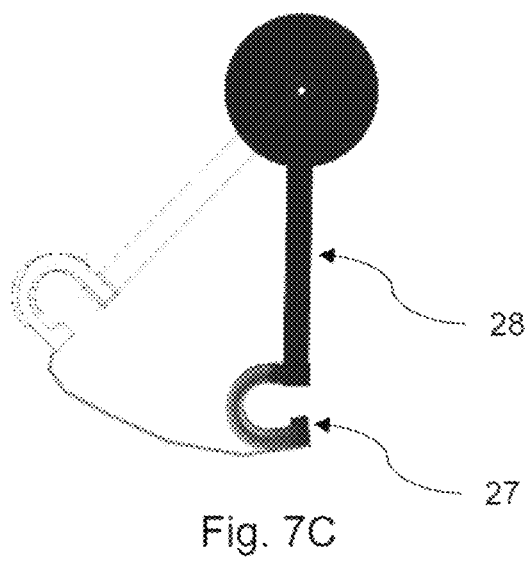

FIGS. 7A through 7C shows a schematic overview wherein it is shown how the sweeping path forms a flattened portion of the arcuate path. In this example, the sweeper shoe 25 is driven to vary centripetal force on the sweeper shoe to control radial compliance so as to form the flattened portion of the arcuate path. More specifically, a sweeper arm 28 is shown during various stages of rotation. FIG. 7A shows the sweeper shoe in a first position, as it is approaching the surface of the receiving conveyor belt 9, not shown in the figure. In FIG. 7B the sweeper shoe is being accelerated towards the surface of the receiving conveyor belt 9. The flexible body portion 30 elastically deforms due to the centrifugal forces, causing the bottom part 27 to form a larger opening 34, relative to when the sweeper shoe 25 is in rest, in the C-shaped profile.

The flat sweeping path may keep a gap e.g. from 0.1 to 1 cm above the conveying plane 26 formed by top of the conveyor belt surface. For each ejection action, three acceleration/deceleration phases may be applied to the sweeper shoed 25 by the drive. A first acceleration phase may be applied during which the rotational speed increases at a constant acceleration for a certain time e.g., 0.05 s. During this first phase, the G-shaped profile elastically deforms and reaches out until its bottom surface is near the top of the belt surface, with a desired gap of e.g. 0.1 to 1 cm.

A second phase of constant velocity with no acceleration or deceleration may be applied by the drive to the sweeper shoe 25. Due to the fast increase of velocity at the above first phase, the rate of internal energy change is fast, which will lead to a very high internal "spring-back" force in the elastic material of the sweeper shoe 25, e.g. a car tire rubber. As the acceleration is suddenly stopped in this phase, the internal force of rubber is larger than that of the centrifugal force which does not increase under the constant velocity. Therefore, the bottom portion 27 of the sweeper shoe 25 will spring back to some extent, which counterbalances the decrease of the gap as the arm 28 rotates to the centerline, thus forming a relatively flat sweeping path with certain gap over the belt surface. The flat sweeping path is mainly formed in this phase. A third phase of deceleration may be applied to the drive to the sweeper shoe 25, during which the speed of the sweeper shoe 25 decreases gradually, corresponding to the decrease of centrifugal force that causes the rubber to spring back more significantly, with the bottom portion 27 of the sweeper shoe 25 being increasingly further to the belt surface, until the end of the ejection cycle. In this example, subsequent sweeping actions are performed in less than 1 second, in particular in about $\frac{1}{7}^{th}$ second.

In an alternative arrangement, which is currently not preferred for reasons of wear the G-shaped profile may be driven to come into contact with the surface of the receiving conveyor belt 9, so that the flexible body portion 30 elastically deforms due to the force applied by the surface of the receiving conveyor belt 9 on the bottom part 27. Doing so causes the sweeping path to form the flattened portion of the arcuate path.

The described system for recycling scrap 1 operates as follows. First, scrap S1 is shredded into shredded scrap objects S2. The objects are fractionated, depending on the objects size, using a sieve 3. The fractionated objects are singulated, using a singulation arrangement 8. The singulation arrangement 8 comprises a chute 15 having a funneled section 17, placing the scrap objects S2 in a singulated fashion on the receiving conveyor belt 9. Due to the high velocity of the receiving conveyor belt 9 relative to the velocity of the scrap objects S2 at the end of the chute 15, interspace is promoted between singulated scrap objects S3. The singulated scrap objects S3 are scanned, using a scanner 10, to determine the location of the singulated scrap objects S3 on the receiving conveyor belt 9. In addition, the material composition of individual singulated scrap objects S3 is determined using the scanner 10. This data is used to actuate the ejector arrangement 11, such that an ejector device 24 is actuated at the right time such that the singulated scrap object S3 is ejected from the receiving conveyor 9 such that it is grouped with scrap objects having the same material composition. The system for recycling scrap is controlled by a single controller, or computer. As a result, the described invention provides an automatic system and method for sorting scrap while minimizing the need for transport and manual labor.

EXAMPLE 1

In an experiment, a horizontally disposed vibratory feeder was fed with aluminum scrap particles as objects. The particles were fed from a conveyor belt at an average rate of 4 particles per second. At least 70% of the particles on the conveyor belt were free and non-overlapping and did not visibly entangle on the surface of the vibratory feeder. After being transported on the feeder receiving area for receiving scrap objects to a feed gate positioned at a top portion of a chute where the scrap particles dropped off from the edge of the feeder to the chute, the time of drop-off for each particle was recorded. This way the distribution of the time passing between consecutive particles dropping off could be calculated. The resulting distribution is shown in Table 1 for two frequencies of vibration of the vibratory feeder. In both cases, the average time between consecutive particles was close to 0.25 seconds, as a direct consequence of feeding at an average rate of 4 scrap particles per second. The distributions were quite similar, with a slightly lower percentage for the 0-0.05 s interval at the higher frequency.

TABLE 1

Distribution of the time between two consecutive particles dropping from the vibratory feeder, for two different frequencies of the vibratory engine.

| Time between particles [s] | Low frequency % | High frequency % |
|---|---|---|
| 0-0.05 | 13.9 | 12.5 |
| 0.05-0.10 | 11.5 | 11.4 |
| 0.10-0.15 | 12.8 | 10.7 |
| 0.15-0.20 | 8.1 | 11.9 |
| 0.20-0.25 | 9.5 | 8.8 |
| 0.25-0.30 | 8.1 | 10.4 |
| 0.30-0.35 | 7.8 | 7.3 |
| 0.35-0.40 | 6.6 | 6.2 |
| 0.40-0.45 | 5.0 | 5.3 |
| >0.45 | 16.6 | 15.5 |

The intention of the feeding process was to feed scrap particles from the feeder onto a sorting belt running at 3 m/s, which was the maximum practical speed for sensors along the sorting belt to scan the particles before ejecting them into a number of different product outlets. It was found that in order for a scrap particle to be optimally ejected with minimal disturbance of neighboring particles on the sorting belt, the distances between the centers of consecutive particles in the direction of transport of the belt were preferred to be at least 0.35 m for average-sized particles of 0.3 m length in the direction of the conveyor. This 0.35 m spacing translates to about 0.12 s, i.e., 0.35 m/(3 m/s), difference in arrival time on the sorting belt. The data in Table 1 show that if the scrap particles were dropped directly from the feeder onto the sorting belt, about 70% of the particles would drop more than 0.12 s after the previous particle and again about 70% of them would drop more than 0.12 s before the next particle would arrive on the sorting belt (for the lower frequency of the feeder engine). As a consequence, only about 50% of the scrap particles on the sorting belt are found to be distant enough from neighboring particles to allow desired ejection into a product.

Therefore, a chute was introduced between the feeder and the sorting belt. The chute was formed as a gutter, i.e. with a trough shaped cross section that includes a base section and sidewalls extending upwardly therefrom. The chute was designed with a wide, convex transition section at a top portion of the chute in which the particles freely accelerated to ca 4 m/s, after which the section contracted as a funnel, forcing the particle flow to converge to a single file. This funneled section of the chute extended substantially linearly downward. This converging operation is most successful if the space between consecutive particles exceeds the size of the particles in the flow direction, i.e., 0.3 m on average. This relates to a desired minimum time between particles dropping from the feeder of 0.075 s, i.e., 0.3/(4 m/s), for an average-size particle. According to Table 1, the probability of success is about 80% for the lower feeder frequency. This means that the probability for a particle to be sufficiently spaced with respect to the previous and next particles is about 64%. In a concave transition section between of the chute the funneled section and the bottom portion that ends approximately horizontally at an edge gate positioned at a substantially horizontally disposed receiving conveyor the scrap particles are decelerated to about 2.5 m/s by friction. In this section, the particles are found to push each other to make space at the lower transport velocity in the gutter without getting entangled or overlapped. Finally, the transition from the concave portion of the gutter to the sorting belt with a speed of 3 m/s creates a gap of ca 0.05 m between consecutive scrap particles, so that each scrap particle can easily be ejected from the sorting belt without problems. The complete process is schematically shown in FIG. 13 for three particles with times between dropping off from the feeder of 0.1 s and 0.2 s, respectively.

FIG. 13: Particles with a length in the direction of the conveyor belt of 0.3 m each, dropping off from the feeder at time intervals of 0.2 s (light grey vs stippled) and 0.1 s (stippled vs dark grey). A: relative positions of the three scrap particles if thrown directly from the feeder onto the sorting belt at 3 m/s. B: relative positions at the point of the funnel of the chute at 4 m/s. C: relative positions at the point in the concave chute section where the dark grey and stippled scrap particle start pushing each other to make room while slowing down. D: relative positions at the end of the concave section at 2.5 m/s. E: final relative positions of the three scrap particles on the conveyor belt at 3 m/s.

EXAMPLE 2

In example 2, the operation of an exemplary ejector arrangement is demonstrated. In the example, the ejector arrangement comprises a conveyor with a substantially flat conveying plane 26 and an ejector device 24 disposed along the conveyor. The ejector device 24 is arranged to eject objects S5, S6, S6, S8 from a row of singularized objects travelling in a conveying direction along the conveying plane 26. Additionally, the ejector . . . device 24 includes a sweeper shoe 25 that is mounted to the ejector device 24 to pivot along a substantially arcuate path about an axis of rotation that extends at interspace above the conveying plane 26. The sweeper shoe 25 has a bottom portion that is arranged to be driven to pass along the conveying plane 26 in a sweeping path that extends transversely to the conveying direction. The bottom portion 27 of said sweeper shoe 25 is provided with radial compliance relative to the axis of rotation so that when driven to pass along the conveying plane 26, the sweeping path forms a flattened, in particular linear, portion of the arcuate path that extends substantially in or parallel to the conveying plane 26.

In the example, scrap objects (e.g., S5 to S8) include scrap particles with a screen passing size in the range 100-180 mm that have been singulated on the conveyor belt of which the width (along a x-direction) is 0.6 m and the running speed V_Belt is 3 m/s (along a y-direction), as shown schematically in FIG. 8. The ejector device 24 of the example has four sweeper arms 28 of which each has a radial length of about 0.4 m, including roughly 0.1 m from the flexible rubber sweeper shoe 25 at the end. The ejector device 24 is placed with its sweeping path (indicated by the dashed line T in FIG. 8) running at an angle θ (0-60° in the shown example) with the transport direction D1 of the belt. Once the ejector device 24 receives a signal for the ejection of a scrap particle, it is electronically controlled to move its sweeper arms 28 at a predefined speed scheme for about 0.15 ms to complete a 90-degree rotation (as shown in FIGS. 9A and 9B). During the ejection operation, the bottom 27 of the flexible rubber sweeper shoe 25 moves close to and parallel to the conveying plane from 0.2≤x≤0.4 m (as shown in FIG. 9B, corresponding to dashed line T in FIG. 8), which can be defined as the effective region for ejecting a scrap particle.

In particular, in a first step of increasing the rotational speed of the sweeper shoe as it moves counterclockwise f, it stretches out and bends radially outward from the circular arcuate path it would otherwise follow. During a subsequent step of keeping the rotational speed constant, the sweeper shoe 25 returns to its original form in a radial inward motion, compresses due to inertia in a radial inward movement, and springs back to its original position in a radial outward movement. As a net result, the sweeper shoe 25 is driven so that the arcuate path of the sweeper shoe 25 includes a flattened portion, in particular a linear segment, where it can move along a sweeping path parallel to the conveyor belt at the ejection region. As a last step, the rotational speed is decreased to allow the sweeper shoe to come to a stop.

The rotation speed of the sweeper shoe thus reaches its maximum and becomes almost constant in said ejection region, with a linear velocity V_Blade of about 6 m/s. This results in V_Blade cos 0=V_Belt, meaning the sweeper shoe 25 and the conveyor belt moves at a similar speed along the transport direction D1, which condition is found to result in a robust ejection of scrap particles with minimal probability of accidentally ejecting scrap particles travelling before or after the scrap particle to be ejected.

In the example, prior to the ejection operation, each scrap particle is scanned by sensors/cameras, including recording the x-coordinate of the leftmost point of the scrap body on the belt (i.e., x_(s,min)). If x_(s,min) is in the effective region for ejection, i.e., 0.2≤x_(s,min)≤0.4 m (bounded by the dashed lines in FIG. 8), the scrap particle can be well ejected, i.e., without A) risk of getting stuck between the shoe and the belt, or, B) risk of being not (fully) hit by the shoe. In this respect it is observed that driving a sweeper shoe to follow an arcuate path, in particular a circular path, can be very cost effective from an engineering point of view. However, without flattened portion, an arcuate path may not allow for reliable ejection. For example, at the circular portion of the path at x_(s,min)>0.4 m, corresponding to the scrap particle being at the right to the effective ejection region, the bottom of the sweeper shoe 25 may be too high from the conveyor belt when it reaches the position of the scrap particle and may fail to eject the scrap particle from the conveyor belt. On the other hand, e.g. if x_(s,min)<0.2 m (like S8 in FIG. 8), it can be possible that the sweeper shoe 25 will hit on the top of the body of the scrap particle and can get stuck on the conveyor belt due to the downwards compression of the arm; this may get the equipment damaged and should be avoided by letting such scrap particles (x_(s,min)<0.2 m) pass through towards the residue at the end of the conveyor belt without an ejection operation.

EXAMPLE 3

Comparison of Scrap Sorting Processes: Spaced Vs. Buffered

A Discrete Element Method (DEM) simulation was performed on a set of scrap particles produced by shredding, in order to demonstrate the effect of keeping the scrap particle spaced from after the shredding process up to the sorting process on the sorting conveyor. In one of the two example cases, the set of scrap particles was kept internally spaced, with the effect that the particles showed a minimum tendency to entangle, and move together as a single particle. In the other example, the same set of particles were stored in a buffer after shredding, and were fed to the sorting feeder from this buffer, with the effect that the particles showed a considerable amount of entangling, with a consequence that particles moved together as a single particle and could not be individually sorted.

To compare the efficiency of the two feeding methods, i.e., non-buffered and buffered feeding, on the singulation of scraps, computer simulation based on the discrete element method (DEM) is conducted. As shown in FIGS. 10A, 11A and FIGS. 10B, 11B, a number of scraps (about 50 pieces) that have complex shapes (shapes scanned from real scraps in experiments) are fed into the processing line by the non-buffered and buffered feeding approaches, respectively.

In the simulation, a singulating arrangement for singulating scrap objects S2, S3 is used corresponding to the exemplary embodiment discussed above. In particular, similar to FIG. 4 the singulating arrangement of FIGS. 10, 11 and 12 comprises a substantially horizontally disposed feeder 22 that extends from a receiving area for receiving scrap objects to a feed gate positioned at a top portion of a chute to feed scrap objects to the chute. The chute 15 has a trough shaped cross section that includes a bottom portion and sidewalls extending upwardly therefrom. The chute 15 extends downwardly from the top portion to a bottom portion and includes a funneled section in which the width of the trough-shaped cross section reduces. The bottom portion of the chute 15 forms an edge gate positioned at a substantially horizontally disposed receiving conveyor 9 to receive objects S2, S3 travelling down the chute.

In the non-buffered feeding (FIGS. 10A, 11A), scraps are fed naturally after falling through a screen hole (indicated by the shading area in FIG. 10A). In buffered feeding (FIGS. 10B, 11B), a batch of scraps initially stored in a container (or a bag) are fed through the opening at the bottom of the container. Different geometries or sizes of the opening at the bottom have been tested for creating different feeding rates of scraps. The results show that the bottom opening of the container should preferably be kept flat with the opening size as the cross-sectional size of the upper part of the container (like the flat-bottom hopper with full opening at the bottom), otherwise a part of scraps are easily stuck due to being entangled together (and/or the compressed pressure between scraps and side-walls of the container) and cannot be fed through the opening.

For both approaches, scraps after feeding are transported by the vibratory feeder towards the chute, before they finally arrive at the conveyor belt. By comparison, the buffered feeding leads to a larger fraction of scraps being overlapped or entangled in the vibratory feeder (FIG. 12A), thus resulting in less singulation of scraps on the conveyor belt. Quantitative comparisons of the delay time distributions indicate that the buffered feeding approach leads to more scraps at a smaller delay time value (FIG. 12C). Accordingly, the singulation rate for non-buffered feeding in this test is about 86%, and the singulation rate for buffered feeding in this test is about 40%. Hence, this comparison illustrated the significant effect of feeding methods on the singulation of scraps.

Summarizing, the disclosure includes the following numbered embodiments A through C, which may each be combined.

Embodiment A1: A method of recycling scrap, comprising the steps of
shredding the scrap with a shredder into shredded scrap objects, the scrap being shredded to include objects having maximum pass through dimensions in the range of 50-200 mm, preferably 100-180 mm,
classifying the shredded scrap objects into fractions of scrap objects having different size ranges with a classifier, at least one size range including objects having maximum pass through dimensions in the range of 50-200 mm, preferably 100-180 mm and
sorting scrap objects from at least one size range that includes objects having maximum pass through dimensions in the range of 50-200 mm, preferably 100-180 mm, while substantially maintaining interspace between the objects.

Embodiment A2: The method of Embodiment A1, wherein the scrap is shredded with the shredder into interspaced shredded scrap objects and wherein the scrap objects are fed directly from the shredder to the classifier while substantially maintaining interspace between the objects.

Embodiment A3: The method of Embodiment A1, wherein the scrap is shredded with the shredder into interspaced shredded scrap objects and wherein the shredded scrap objects are deposited from the shredder with interspace onto a conveying plane, and wherein the shredded objects are conveyed to the classifier on the conveying plane while substantially maintaining said interspace between said objects.

Embodiment A4: The method of any of Embodiments A1-A3, wherein the step of sorting the scrap objects from said at least one size range that includes objects having maximum pass though dimensions in the range of 100-200 mm, preferably 100-180 mm, comprises a step of singulating shredded objects from said fraction of scrap objects into a row.

Embodiment A5: The method of any of Embodiments A1-4, wherein the classifier includes a sieve onto which shredded objects are fed, and wherein said classifying step includes sieving the shredded scrap objects into fractions of scrap objects having maximum pas through dimensions of different size ranges.

Embodiment A6: The method of any of Embodiments A1-A5, wherein said step of sorting said objects further comprises a step of scanning objects.

Embodiment A7: The method of any of Embodiments A1-A6, wherein said step of sorting said objects further comprises a step of ejecting objects.

Embodiment A8: The method of embodiments A6 and A7, wherein results from scanning, together with a decision to eject a scrap particle into a specific product bin are combined to estimate a running average of the alloy composition or grade of the collected scrap in that bin.

Embodiment A9: A system for recycling scrap comprising a shredder for shredding scrap into shredded scrap objects and a classifier for classifying the shredded scrap objects into fractions of scrap objects having different size ranges, at least one of said size ranges including objects having maximum pass through dimensions in the range of 50-200 mm, preferably 100-180 mm, further comprising a sorter arranged to sort objects from said at least one size range that includes objects having maximum pass through dimensions in the range of 50-200 mm, preferably 100-180 mm, while substantially maintaining interspace between the objects.

Embodiment A10: The system of Embodiment A9, wherein said shredder is arranged to shred scrap into interspaced shredded scrap objects and herein said shredder is arranged to feed the interspaced shredded scrap objects to the classifier while substantially maintaining interspace between the objects.

Embodiment A11: The system of Embodiment A10, wherein the shredder is arranged to feed the interspaced scrap objects directly to the classifier.

Embodiment A12: The system of Embodiment A10, wherein the system includes a conveyor to feed the interspaced crap objects to the classifier, the conveyor including a conveyor plane arranged to receive the shredded objects from the shredder with interspace, and to convey the shredded objects to the classifier while maintaining said interspace.

Embodiment A13: The system of any of Embodiment A9-A12, wherein the classifier includes a sieve onto which the shredded objects are fed, which sieve classifies the shredded scrap objects into fractions of scrap objects having different size ranges, at least one of said size ranges including objects having maximum pass through dimensions in the range of 50-200 mm, preferably 100-180 mm.

Embodiment A14: The system of any of Embodiments A9-A13, wherein the sorter includes a singulating arrangement for singulating scrap objects of said at least one size range that includes objects having maximum dimensions in the range of 50-200 mm, preferably 100-180 mm.

Embodiment A15: The system of any of Embodiments A9-A14, wherein the sorter further includes an ejector arrangement placed downstream of the singulating arrangement for singulating scrap objects, for ejecting singulated scrap objects.

Embodiment A16: The system of any of Embodiments A9-A15, wherein the sorter further includes a scanner for scanning scrap objects, arranged between a singulating arrangement and an ejector arrangement.

Embodiment B1: An ejector arrangement, comprising a conveyor with a substantially flat conveying plane and an ejector device disposed along the conveyor, the ejector device being arranged to eject objects from a row of singularized objects travelling in a conveying direction along the conveying plane, the ejector device including a sweeper shoe that is mounted to the ejector device to pivot along a substantially arcuate path about an axis of rotation that extends at interspace above the conveying plane, the sweeper shoe having a bottom portion that is arranged to be driven to pass along the conveying plane in a sweeping path that extends transversely to the conveying direction, wherein the bottom portion of said sweeper shoe is provided with radial compliance relative to the axis of rotation so that when driven to pass along the conveying plane, the sweeping path form a flattened portion of the arcuate path that extends substantially in or parallel to the conveying plane.

Embodiment B2: The ejector arrangement of Embodiment B1, wherein the axis of rotation extends obliquely relative to the conveying direction.

Embodiment B3: The ejector arrangement of Embodiments B1 or B2, wherein the sweeper shoe is arranged for full rotational movement about the axis of rotation in a plane of rotation.

Embodiment B4: The ejector arrangement of any of Embodiments B1-B3 wherein the sweeping path is centered on a centerline through the row of singularized objects travelling in the conveying direction along the conveying plane.

Embodiment B5: The ejector arrangement of any of Embodiments B1-B4, wherein the ejector device comprises one or more sweeper arms, each sweeper arm carrying a sweeper shoe at a radial outward end.

Embodiment B6: The ejector arrangement of any of Embodiments B1-B5, wherein the sweeper arm(s) radially extend from a central shaft of which a centerline corresponds to the axis of rotation.

Embodiment B7: The ejector arrangement of any of Embodiments B1-B6, wherein the bottom portion of the sweeper shoe is provided with elastic radial compliance relative to the axis of rotation.

Embodiment B8: The ejector arrangement of any of Embodiments B1-B7, wherein the sweeper shoe comprises a flexible body portion.

Embodiment B9: The ejector arrangement of any of Embodiments B1-B8, wherein the sweeper shoe is elastically deformable in radial direction.

Embodiment B10: The ejector arrangement of Embodiment B9, wherein the real and imaginary components of the Young's modulus of the elastic material of the sweeper shoe vary less than 40%, preferably less than 20% over a temperature working range of the shoe ranging from 0° C.-50° C., preferably 10° C.-40° C.

Embodiment B11: The ejector arrangement of any of Embodiments B1-B9, wherein the sweeper shoe comprises a profile having an open cross section.

Embodiment B12: The ejector arrangement of any of Embodiments B1-B10, wherein the sweeper shoe has a planar hitting surface that in the flattened portion of the sweeping path is arranged to extend in or parallel to the conveying direction in a plane substantially transversely to the conveying plane.

Embodiment B13: The ejector arrangement of any of Embodiments B1-B12, wherein the sweeper shoe comprises a flexible body portion formed as a substantially C or G-shaped profile, a bottom of the C-shaped profile arranged to form the bottom portion of the sweeper shoe and an end face of the C-shaped profile forming the hitting surface.

Embodiment B14: The ejector arrangement of any of the preceding Embodiments B1-B13, wherein the sweeper shoe is arranged to be driven to pass along the conveying plane with interspace, so as to pass along the conveying contactless.

Embodiment B15: The ejector arrangement of any of the preceding Embodiments B1-B14 wherein a drive of the sweeping shoe is arranged to vary centripetal force on the sweeping shoe to control radial compliance so as to form the flattened portion of the arcuate path.

Embodiment B16: An ejector device, in particular for an ejector arrangement of any of Embodiments B1-B16, the ejector device including a sweeper shoe that is mounted to the ejector device to pivot along a substantially arcuate path about an axis of rotation, the sweeper shoe having a bottom portion that is arranged to be driven to pass along a conveying plane, wherein the bottom portion of said sweeper shoe is provided with radial compliance relative to the axis of rotation so that when driven to pass along the conveying plane, the sweeping path forms a flattened portion of the arcuate path that extends substantially in or parallel to the conveying plane.

Embodiment B17: The ejector device of Embodiment B16, wherein the ejector device comprises one or more sweeper arms that radially extend from a central shaft of which a centerline corresponds to the axis of rotation, each sweeper arm carrying a sweeper shoe at a radial outward end, wherein the sweeper shoe has a planar hitting surface that is arranged to extend at an acute angle to the axis of rotation.

Embodiment B18: The ejector device of Embodiment B16 or B17, wherein the sweeper shoe comprises a flexible body portion formed as a substantially C-shaped profile so as to be elastically deformable in radial direction relative to the sweeper arm, a bottom of the C-shaped profile arranged to form the bottom portion of the sweeper shoe and an end face of the C-shaped profile forming a hitting surface of the sweeper shoe.

Embodiment B19: A method of ejecting objects from a row of singularized objects travelling in a conveying direction along the conveying plane, in particular using an ejector arrangement or ejector in accordance with any of the preceding embodiments B1-B18, wherein a sweeper shoe is pivoted along a substantially arcuate path about an axis of rotation that extends at interspace above the conveying plane and wherein a bottom portion of the sweeper shoe is driven to pass along the conveying plane in a sweeping path that extends transversely to the conveying direction through the row of objects, wherein when driven to pass along the conveying plane a bottom portion of said sweeper shoe is radially displaced relative to the axis of rotation so that the sweeping path forms a flattened portion of the arcuate path that extends substantially in or parallel to the conveying plane, and wherein a hitting surface of the sweeper shoe engages an object to eject if from the row.

Embodiment B20: The method of Embodiment B19, wherein the sweeper shoe is driven to pass along the conveying plane with interspace, so as to pass along the conveying contactless.

Embodiment B21: The method of Embodiments B19 or B20, wherein the sweeping shoe is driven to vary centripetal force on the sweeping shoe to control radial compliance so as to form the flattened portion of the arcuate path.

Embodiment B22: The method according to any of Embodiments B19-21, wherein the sweeping path extends obliquely relative to the conveying direction.

Embodiment B23: The method according to any of Embodiments B19-22, wherein the sweeper shoe is rotated in a plane of rotation in an indexed rotational movement.

Embodiment B24: The method according to any of Embodiments B19-B23, wherein subsequent sweeping actions are performed in less than 1 second, e.g. less than 0.5 second, or even less than 0.3 second.

Embodiment C1: A singulating arrangement for singulating scrap objects, comprising a substantially horizontally disposed feeder that extends from a receiving area for receiving scrap objects to a feed gate positioned at a top portion of a chute to feed scrap objects to the chute, the chute having a trough shaped cross section that includes a bottom portion and sidewalls extending upwardly therefrom, said chute extending downwardly from the top portion to a bottom portion and including a funneled section in which the width of the trough-shaped cross section reduces, said bottom portion of the chute forming an edge gate positioned at a substantially horizontally disposed receiving conveyor to receive objects travelling down the chute.

Embodiment C2: The singulating arrangement according to Embodiment C1, wherein the receiving conveyor is arranged to accelerate the travelling objects upon passing through the gate of the chute.

Embodiment C3: The singulating arrangement according to Embodiment C1 or C2, wherein the singulating arrangement includes a convex transition section between the gate of the feeder and the top portion of the chute.

Embodiment C4: The singulating arrangement according to any of Embodiment C1-C3, wherein the funneled section of the chute extends substantially linearly downward.

Embodiment C5: The singulating arrangement according to any of Embodiments C1-C4, wherein the chute includes a concave transition section between the funneled section and the bottom portion.

Embodiment C6: The singulating arrangement according to any of the preceding Embodiments C1-15, wherein the bottom portion of the chute is substantially horizontally disposed.

Embodiment C7: The singulating arrangement according to any of the preceding Embodiments C1-C7, wherein at the gate of the chute the side walls protrude in direction of travel of the objects beyond the bottom section and extend to overlap with the conveyor.

Embodiment C8: The singulating arrangement according to any of the preceding Embodiments C1-C7, wherein the feeder comprises a skirt at the receiving area to decelerate objects received onto the feed plate.

Embodiment C9: The singulating arrangement according to any of the preceding Embodiments C1-C8, wherein the chute includes one or more actuators to act on individual objects travelling down the chute.

Embodiment C10: The singulating arrangement according to any of the preceding Embodiments C1-C9, wherein the feeder includes a trough-shaped cross section that having a bottom portion and sidewalls extending upwardly therefrom, which cross section tapers towards the feed gate.

Embodiment C11: A chute, in particular for a singulating arrangement according to any of Embodiments C1-C10, the chute having a trough-shaped cross section that includes a bottom portion and sidewalls extending upwardly therefrom and extending downwardly from the top portion to a bottom portion and including a funneled section in which the width of the trough-shaped cross section reduces, the bottom portion of the chute forming an edge gate wherein the funneled section of the chute extends substantially linearly downward and wherein the chute includes a concave transition section between the funneled section of the chute and the bottom portion.

Embodiment C12: The chute according to Embodiment C11, wherein the bottom portion of the chute is substantially horizontally disposed, and wherein at the gate of the chute the sidewalls protrude beyond the bottom section.

Embodiment C13: The chute according to Embodiments C11 or C12, wherein the chute includes one or more actuators to act on individual objects travelling down the chute, in particular nozzles and/or movable fingers.

Embodiment C14: A method of singulating scrap objects by feeding scrap objects via a downward chute onto a conveyor, in particular using a singulating arrangement or cute according to any of the preceding Embodiments C1-C13, the method including the steps of
- feeding the scrap objects to the chute
- funneling objects that travel downward through the chute into a row
- accelerating the travelling objects upon passing through the gate of the chute with the conveyor.

Embodiment C15: The method of Embodiment C14, wherein in case of overlap of a leading and a trailing object in the direction of travel, the trailing object is engaged to decelerate it relative to a leading object.

Many variations will be apparent to the skilled person in the art. For example, the number of subranges in which the shredded scrap objects are fractioned can be any number of subranges. Furthermore, any of these subranges can be deposited on any number of feeding conveyor belts and any combination of feeding conveyor belts and subranges can be provided.

In another variation, the skilled person understands that any number of regulating arrangements can be used per receiving conveyor.

In an even further variation, the skilled person understands that a different angle α could also be used, for example between 30 degrees and 80 degrees or 45 degrees and 75 degrees or any combination thereof.

Also, it shall be clear that both the singulating arrangement and the ejector arrangement may each be used beneficially stand alone, or in other types of systems or applications than given in this example. In particular, they may be used to act on other type of objects than scrap objects, and are not limited to being used to act on object of the sizes discussed herein.

Such variations are understood to be comprised within the scope of the invention as defined in the appended claims.

LIST OF REFERENCE NUMERALS 1 system for scrap recycling
2 shredder
3 classifier
4 crane
5 feeding conveyor belt
6 conveyor plane
7 magnet
8 singulating arrangement
9 receiving conveyor belt
10 scanner
11 ejector arrangement
12 feeder
13 receiving area
14 feed gate
15 chute
16 side walls
17 funneled section
18 top portion
19 bottom portion
20 edge gate
21 skirt
22 feed plate
23 actuator
24 ejector device
25 sweeper shoe
26 conveying plane
27 bottom portion of sweeper shoe
28 sweeper arm
29 central shaft
30 flexible body portion
31 hitting surface
32 sieve feed
33 sieve deck
34 opening
35 base section
36 sorter
37 bin
38 sieve
α angle of inclination
θ angle of sweeping path
F0 undersized fraction
F1 first fraction
F2 second fraction
F9 oversized fraction
S1 scrap
S2 scrap objects
S3 singulated scrap objects
S4 object
S5 scrap particle
S6 scrap particle
S7 scrap particle
S8 scrap particle
P conveying direction
R axis of rotation
D1 transport direction
T sweeping path

The invention claimed is:

1. A method of recycling scrap, the method comprising:
shredding the scrap with a shredder into shredded scrap objects;
classifying the shredded scrap objects with a size classifier including a plurality of sieve decks to separate the shredded scrap objects into a plurality of size ranges of maximum pass through dimensions as the shredded scrap objects travel along the sieve decks, the sieve decks generating a main group of size ranges of the shredded scrap objects with the shredded scrap objects having a relatively large size with maximum pass through dimensions of between 50-200 mm to allow for singulation of the shredded scrap objects in the main group of size ranges, and further generating a smallest size range of the shredded scrap objects so that the shredded objects have maximum pass through dimensions of less than 50 mm to avoid singulation of the smallest size range of the shredded scrap objects; and
singulating the main group of size ranges of the shredded scrap objects by feeding the shredded scrap objects onto a faster moving downstream surface to create interspace between the shredded scrap objects on the faster moving downstream surface for minimizing entanglement between the singulated shredded scrap objects that may otherwise occur due to the relatively large size thereof.

2. The method of claim 1, wherein the scrap is shredded with the shredder into interspaced shredded scrap objects and wherein the scrap objects are fed directly from the shredder to the size classifier while maintaining interspace between the objects.

3. The method of claim 1, wherein the scrap is shredded with the shredder into interspaced shredded scrap objects and wherein the shredded scrap objects are deposited from the shredder with interspace onto a conveying plane, and wherein the shredded objects are conveyed directly to the size classifier on the conveying plane while maintaining said interspace between said objects.

4. The method of claim 1, further comprising scanning the singulated shredded scrap objects on the moving downstream surfaces.

5. The method of claim 4, wherein results from scanning, together with a decision to eject a scrap object into a specific product bin are combined to estimate a running average of the alloy composition or grade of the collected scrap in that bin.

6. The method of claim 1, further comprising ejecting the singulated shredded objects.

7. The method of claim 6, wherein results from scanning, together with a decision to eject a scrap object into a specific product bin are combined to estimate a running average of the alloy composition or grade of the collected scrap in that bin.

8. The method of claim 1 wherein the sieve decks further generate a largest size range of the shredded scrap objects having maximum pass through dimensions greater than the maximum pass through dimensions of the shredded scrap objects in the main group of size ranges, and
feeding the largest size range of the shredded scrap objects to the shredder.

9. A system for recycling scrap comprising a shredder for shredding scrap into shredded scrap objects, a size classifier including a plurality of sieve decks to separate the shredded scrap objects into a plurality of size ranges of maximum pass through dimensions as the shredded scrap objects travel along the sieve decks, the sieve decks generating a main group of size ranges of the shredded scrap objects with the shredded scrap objects having a relatively large size with maximum pass through dimensions of between 50-200 mm to allow for singulation of the shredded scrap objects in the main group of size ranges, and further generating a smallest size range of the shredded scrap objects so that the shredded objects have maximum pass through dimensions of less than 50 mm to avoid singulation of the smallest size range of the shredded scrap objects, and a sorter configured for singulating the main group of size ranges of the shredded scrap objects by receiving the shredded scrap objects on a moving downstream surface of the sorter for each size range to create interspace between the shredded scrap objects on the moving downstream surfaces for minimizing entanglement between the singulated shredded scrap objects that may otherwise occur due to the relatively large size thereof.

10. The system of claim 9, wherein said shredder is arranged to shred scrap into interspaced shredded scrap objects and wherein said shredder is arranged to feed the interspaced shredded scrap objects to the size classifier while maintaining interspace between the objects.

11. The system of claim 10, wherein the shredder is arranged to feed the interspaced scrap objects directly to the size classifier.

12. The system of claim 10, further comprising a conveyor to feed the interspaced shredded scrap objects to the size classifier, the conveyor including a conveyor plane arranged to receive the shredded scrap objects from the shredder with interspace, and to convey the shredded scrap objects to the size classifier while maintaining said interspace.

13. The system of claim 9, wherein the sorter further includes an ejector arrangement placed along each moving downstream surface for ejecting singulated scrap objects.

14. The system of claim 9, wherein the sorter further includes a scanner along each moving downstream surface for scanning scrap objects prior to reaching an ejector arrangement.

* * * * *